United States Patent [19]

Puma et al.

[11] Patent Number: 5,318,018
[45] Date of Patent: Jun. 7, 1994

[54] ADVANCED AIRCREW PROTECTION SYSTEM

[75] Inventors: Samuel C. Puma, Torrance; Edwin G. Drumheller, Lawndale; Darold B. Cummings, Hawthorne, all of Calif.

[73] Assignee: Northrop Corporation, Hawthorne, Calif.

[21] Appl. No.: 812,900

[22] Filed: Dec. 18, 1991

Related U.S. Application Data

[63] Continuation-in-part of Ser. No. 409,222, Sep. 19, 1989, abandoned.

[51] Int. Cl.$^5$ .................... A62B 17/00; B64D 10/00
[52] U.S. Cl. .................... 128/202.11; 600/19; 600/20
[58] Field of Search ............ 128/202.11, 201.24, 128/204.18, 205.24, 202.19, 202.13; 600/19, 20; 128/200.24, 204.21, 24 R; 244/118.5, 121

[56] References Cited

U.S. PATENT DOCUMENTS

| | | | |
|---|---|---|---|
| 2,760,484 | 8/1956 | Ferwerda | 600/19 |
| 2,966,155 | 12/1960 | Krupp | 600/19 |
| 3,030,626 | 4/1962 | Shepard | 2/2.1 R |
| 3,067,425 | 12/1962 | Colley | 2/6 |
| 3,112,130 | 11/1963 | Miller | 285/276 |
| 3,221,339 | 12/1965 | Correale, Jr. | 2/2.1 R |
| 3,284,805 | 11/1966 | Seeler | 128/202.11 |
| 3,343,536 | 9/1967 | Brisson et al. | 128/202.11 |
| 3,345,641 | 10/1967 | Jennings | 2/2.1 R |
| 3,351,056 | 11/1967 | Durney | 128/202.11 |
| 3,392,405 | 7/1968 | Ritzinger, Jr. et al. | 2/2.1 R |
| 3,413,972 | 12/1968 | Depping | 128/201.23 |
| 3,463,150 | 8/1969 | Penfold | 128/202.11 |
| 3,473,165 | 10/1969 | Gran et al. | 2/6 |
| 3,514,785 | 6/1970 | Smith | 2/2.1 R |
| 3,534,406 | 10/1970 | Barthlome | 2/2.1 A |
| 3,536,576 | 10/1970 | Schwartz | 428/68 |
| 3,559,209 | 2/1971 | Vail | 2/2.1 A |
| 3,621,542 | 11/1971 | Getchell | 28/153 |
| 3,628,531 | 12/1971 | Harris | 128/202.11 |
| 3,667,459 | 6/1972 | Durney | 128/201.15 |
| 3,688,314 | 9/1972 | Hill | 2/2.1 A |
| 3,699,589 | 10/1972 | Durney | 2/2.1 R |
| 3,720,208 | 3/1973 | Aldrich et al. | 128/201.27 |
| 3,780,723 | 12/1973 | Van Patten | 600/19 |
| 3,832,735 | 9/1974 | Elkis et al. | 2/2.1 A |
| 3,841,590 | 10/1974 | Valentine | 244/138 R |
| 4,046,262 | 9/1977 | Vykukal et al. | 414/5 |
| 4,091,464 | 5/1978 | Vykukal | 2/2.1 A |
| 4,091,465 | 5/1978 | Webbon et al. | 2/2.1 A |
| 4,095,593 | 6/1978 | Webbon et al. | 128/202.11 |
| 4,352,353 | 10/1982 | Bolton et al. | 128/201.24 |
| 4,403,608 | 9/1983 | Warncke | 128/201.28 |
| 4,455,685 | 6/1984 | Steffler et al. | 2/2.1 A |
| 4,549,542 | 10/1985 | Chien | 128/201.24 |
| 4,583,522 | 6/1986 | Aronne | 600/20 |
| 4,593,415 | 6/1986 | Vykukal | 2/2.1 A |
| 4,594,734 | 6/1986 | Vykukal | 2/2.1 A |
| 4,596,054 | 6/1986 | MacKendrick et al. | 2/2.1 A |
| 4,598,427 | 6/1986 | Vykukal | 2/2.1 A |
| 4,598,428 | 7/1986 | Vykukal | 2/2.1 A |
| 4,638,791 | 1/1987 | Krogh | 128/1 A |
| 4,799,476 | 1/1989 | McGrady | 128/202.11 |
| 4,881,539 | 11/1989 | Pasternack | 128/201.27 |
| 4,906,990 | 3/1990 | Robinson | 340/945 |
| 5,072,727 | 12/1991 | Aronne | 128/202.11 |
| 5,121,744 | 6/1992 | Njemanee | 128/202.11 |
| 5,127,896 | 7/1992 | de Gaston | 600/20 |

FOREIGN PATENT DOCUMENTS

| | | | |
|---|---|---|---|
| 2549979 | 11/1975 | Fed. Rep. of Germany | 128/201.24 |
| 421212 | 12/1910 | France | 128/202.11 |
| 491609 | 4/1937 | United Kingdom | 128/201.24 |
| 850356 | 10/1960 | United Kingdom | 128/202.11 |
| 1003401 | 9/1965 | United Kingdom | 128/202.11 |

Primary Examiner—Edgar S. Burr
Assistant Examiner—Eric P. Raciti
Attorney, Agent, or Firm—Terry J. Anderson; Robert B. Block; Karl J. Hoch, Jr.

[57] ABSTRACT

An advanced aircrew protection system comprising a helmet assembly adapted to sustain a full pneumatic pressure within the helmet adjacent to the head of the wearer; a suit assembly adapted to sustain a pressure adjacent to selected parts of the body of the wearer; a neck shroud operatively coupled with the helmet assembly and the suit assembly and adapted to pneumatically isolate the helmet assembly from the suit assembly; and controller adapted to independently supply fluid under pressure to the helmet assembly and to the suit assembly. Within the helmet is a dual compartment for an independent supply of fluid to an oral nasal mask separate from the remainder of the helmet assembly.

28 Claims, 10 Drawing Sheets

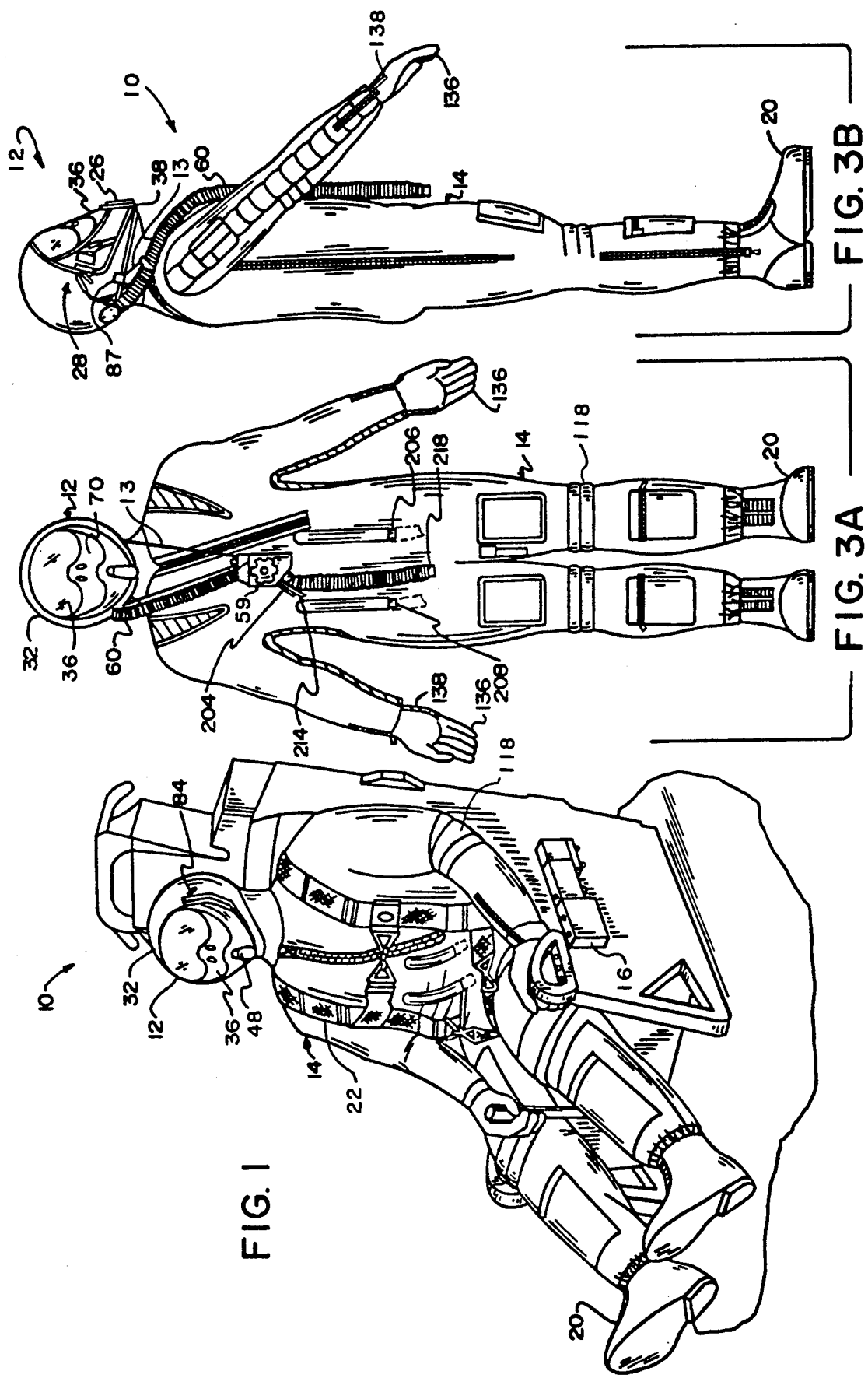

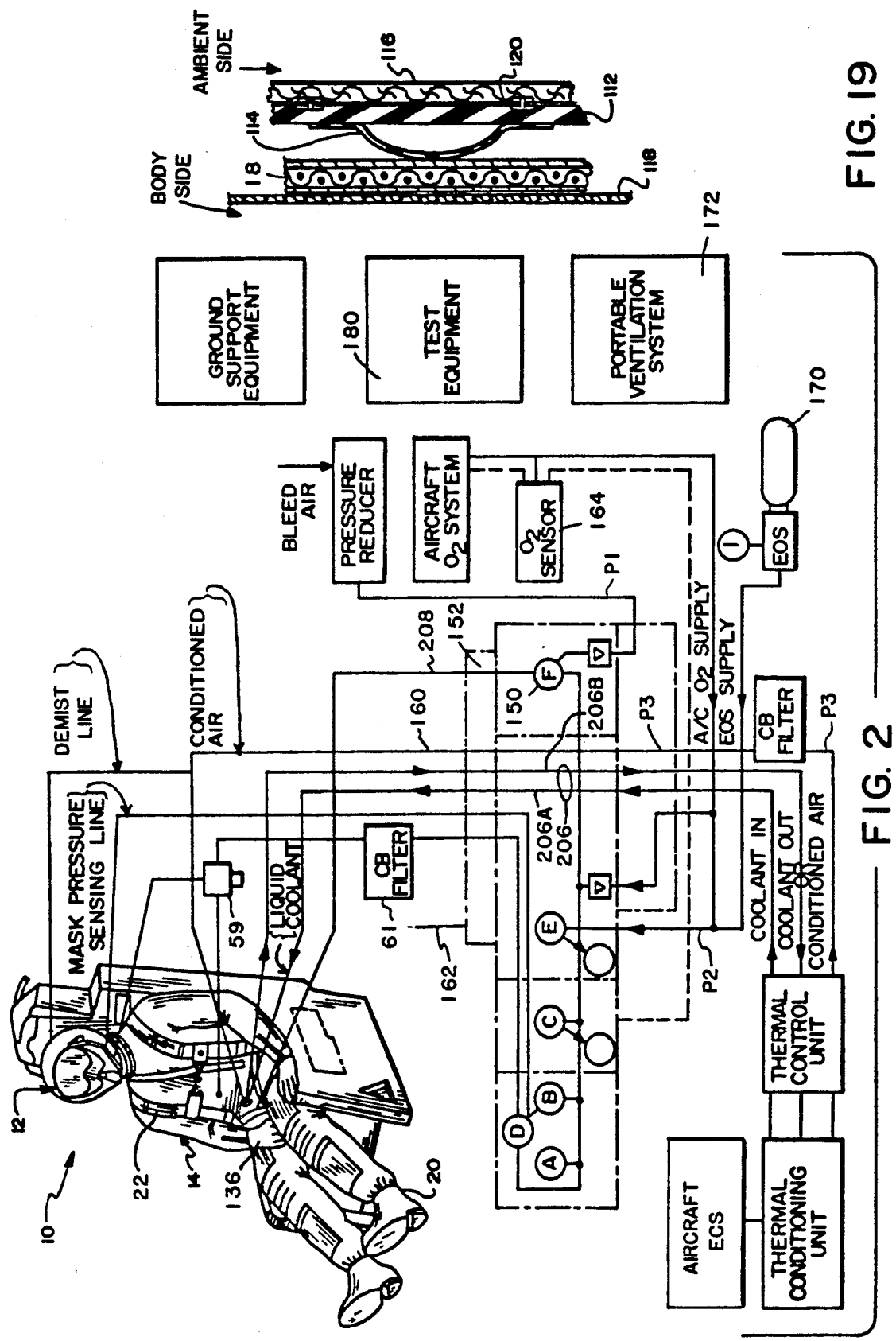

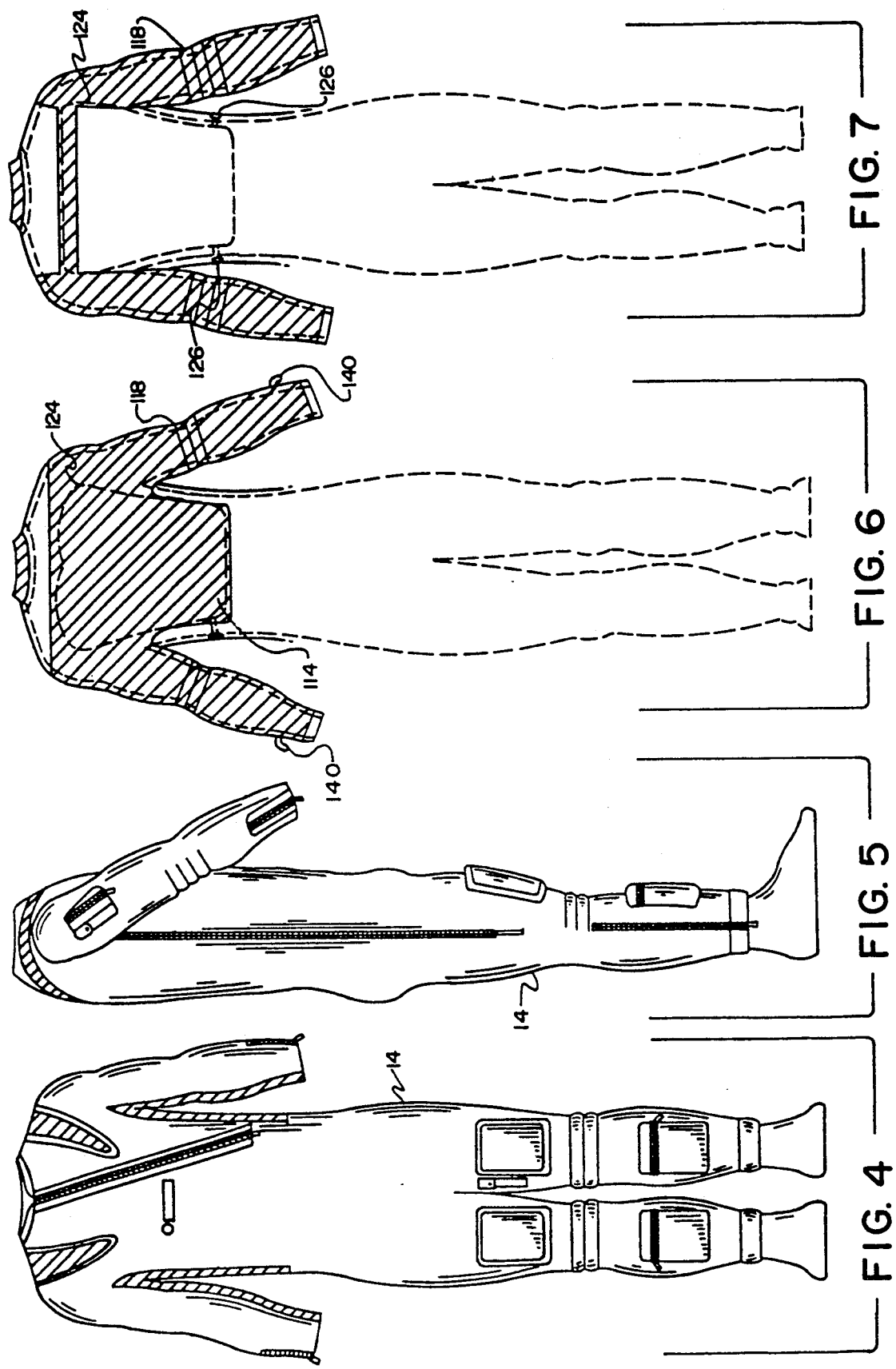

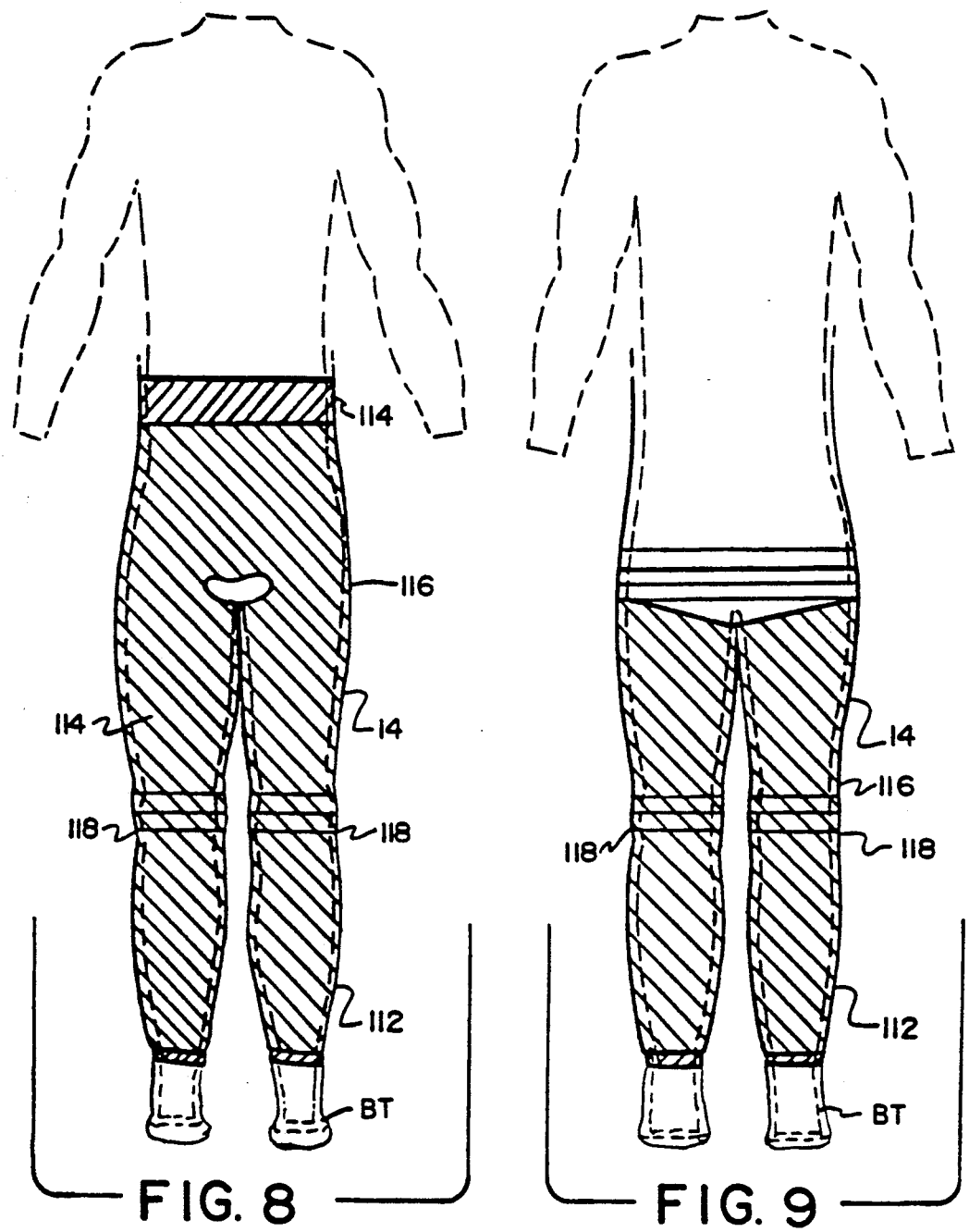

ADVANCED AIRCREW PROTECTION SYSTEM

CROSS REFERENCE TO RELATED APPLICATION

This application is a continuation-in-part application of prior U.S. application Ser. No. 07/409,222 filed Sep. 19, 1989, and entitled ADVANCED AIRCREW PROTECTION SYSTEM, now abandoned.

BACKGROUND OF THE INVENTION

This invention relates to advanced aircrew protection systems and, more particularly, to an improved system, having integrated features for full life support of aircrew for providing full pressurization in the helmet, partial pressurization in the body during high altitude situations, and for providing independent face, chest, upper extremity, abdomen, lower extremity pressurization during high turning acceleration (gravity) situations in aircraft.

DESCRIPTION OF THE BACKGROUND ART

The mission requirements and performance of advanced aircraft dictate that the aircrew be protected from various environmental and aircraft induced hazards which could be detrimental to aircrew performance and mission accomplishment. To afford the aircrew this protection requires a thorough analysis of the design requirements and performance goals of an advanced protection system (APS), i.e., the aircrew's helmet, the suit, and the control and support hardware.

The protection factors of major concern are altitude protection, acceleration protection, ejection and windblast protection, chemical warfare protection, directed energy (lasers, particle beam etc.) protection and climatic protection. Other important considerations are the aircraft interfaces, suit mobility, communications capabilities, and the overall bulk and weight of the system. An advanced protection system, to be effective, must be an integrated protection system to provide protection and life support functions during all mission phases and emergency conditions particularly for advanced aircraft. Such a system must also provide adequate mobility for the accomplishment of aircrew tasks and provide minimal encumbrances upon the aircraft and crew.

A full pressure suit is one in which air or gas is bounded by an impermeable/restraint layer, combination on the ambient side, and the wearers skin on the human side. There is not a second impermeable layer pressing on the skin, (causing pressure directly or indirectly by pulling the restraint layer taut). Pressurizing gas in a partial pressure suit is trapped between impermeable layers.

There are a large number of non-integrated life support protection systems presently known for protecting aircrew members during adverse conditions. One or more of the necessary protections are accomplished to varying extent by such known systems. An optimum system would achieve all of the desired protection objectives to the maximum extent possible in a single integrated system.

Various approaches are disclosed in the patent literature to improved protection systems. By way of example, U.S. Pat. No. 4,455,685 to Steffler et al discloses a partial pressure vest or jerkin for applying pressure through bladders to the chest area of a crewman. U.S. Pat. No. 3,628,531 to Harris discloses a vest or jerkin in association with a helmet.

U.S. Pat. No. 3,284,805 to Seeler discloses an aircrew protection system with an air and/or gas bladder in association with a helmet while U.S. Pat. No. 4,583,522 to Aronne discloses bladders for use in legs for crewmember protection. U.S. Pat. No. 3,392,405 to Ritzinger, Jr. et al; U.S. Pat. No. 3,621,542 to Getchell all disclose full-body bladder systems.

Another body of art discloses helmets and their coupling with suits. Note U.S. Pat. Nos. 3,030,626 to Shepard: 3,112,130 to Miller: 3,221,339 to Correale, Jr.: 3,351,056 to Durney: 3,514,785 to Smith: 3,559,209 to Vail: 3,688,314 to Hill and 4,352,353 to Bolton et al. Note also U.S. Pat. No. 3,413,972 to Depping and U.S. Pat. No. 3,473,165 to Gran et al wherein helmets are disclosed with specific mechanisms for ventilation and/or pressure and/or breathing enhancement. General controls for ventilating aircrew protection systems are disclosed in U.S. Pat. Nos. 3,343,536 to Brisson et al; 3,345,641 to Jennings; 3,463,150 to Penfold; 3,667,459 to Durney; 3,720,208 to Aldrich et al; 4,095,593 to Webbon et al and 4,403,608 to Warncke.

In addition to the foregoing, a wide body of art discloses rigid-type aircrew protection systems. Note, for example, U.S. Pat. Nos. 3,534,406 to Barthlome; 3,832,735 to Elkis et al; 4,091,464 to Vykukal; 4,091,465 to Webbon et al; 4,593,415 to Vykukal; 4,594,734 to Vykukal; 4,596,054 to MacKendrick et al; 4,598,427 to Vykukal and 4,598,428 to Vykukal.

Lastly, the patent literature illustrates a wide variety of features applicable to aircrew protection systems. Note U.S. Pat. No. 3,536,576 to Schwartz which relates to self-sealing materials; U.S. Pat. No. 3,699,589 to Durney which simply relates to a thigh restraint; U.S. Pat. No. 3,841,590 to Valentine which relates to head restraint apparatus; U.S. Pat. No. 3,067,425 to Colley which relates to a penetrable sealing closure structure and U.S. Pat. No. 4,046,262 to Vykukal et al which relates to an anthropomorphic master/slave manipulator system.

Despite these developments, there still exists a need for an efficient, reliable, inexpensive, convenient to use protection system designed to accommodate the needs of aircrew members.

It is a general object of the present invention to provide a new, useful and unobvious combination of component elements, for use as an aircrew protection system which will overcome the above limitations and disadvantages in a fully integrated system.

It is a further general object of the invention to provide an aircrew protection system of the above character which integrate all sustaining life support functions and protection from alien and hostile environments in a single integrated protection system. By "alien" is meant include adverse hypoxia, hypobarism, thermal, acceleration, and mechanical. By "hostile" is meant to include adverse effects of conventional weapons, thermonuclear, biological chemical, and directed energy beams.

It is a further general object of the invention to provide an aircrew protection system of the above character that is modular so that it can be functionally modified to fit the requirement of different mission scenarios.

To achieve these objects, the invention to provides an advanced aircrew protection system comprising a helmet assembly adapted to sustain a full pneumatic pressure within the helmet adjacent to the head of the wearer; a suit assembly adapted to sustain a pressure adjacent to selected parts of the body of the wearer; a neck shroud operatively coupled with the helmet assembly and the suit assembly and adapted to pneumatically isolate the helmet assembly from the suit assembly; and control means adapted to independently supply air under pressure to the helmet assembly and to the suit assembly.

It is another object of this invention to pressurize an aircrew protection system in the event of cabin pressure failure by activating a full pressure helmet assembly and a partial pressure suit assembly with independent pressures.

It is a further object of the invention to pressurize the suit assembly of an aircrew protection system to preselected pressures in preselected areas.

It is a further object of the invention to protect aircrew members in high (gravity) turning acceleration situations by providing increased pressure to the lungs while equalizing the pressure between the wearer's face and exterior chest; while maintaining an independent pressure on other areas of the wearer's head and body.

It is a further object of the invention to control the pressurization to different portions of a suit of an aircrew protection system through an anti-gravity valve controlling one pressure source to one portion of the suit according to one schedule and through a breathing regulator controlling another pressure source to another portion of the suit according to another schedule and to interrelate the anti-gravity valve and breathing regulator for an integrated maintenance of the pressures provided to the suit.

Lastly, it is an object of the present invention to protect aircrew members in high altitude and/or high (gravity) turning acceleration situations while providing protection from ejection, cold water immersion, chemical warfare, physical objects, etc. while maintaining comfort, mobility, visual and communications capabilities.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into an improved advanced protection system comprising a helmet assembly, a suit assembly and a control assembly. The helmet assembly has an oral nasal mask and means to sustain an oxygen supply to within the mask and upper portion of the suit from one pneumatic pressure source and, to within the remainder of the helmet, from another pneumatic pressure source. The helmet also has means to movably couple the mask with respect to the remainder of the helmet between a raised inoperative position and a lowered operative position. The suit assembly has means to maintain a pressurized fluid supply from yet a further pneumatic pressure source to selected lower parts of the body of a wearer. The control assembly has first control means to activate the various pneumatic pressure sources in response to high altitude/low pressure situations as a function of the pressure and further control means to activate the various pneumatic pressure sources in response to high (gravity) turning acceleration.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is a perspective illustration of an aviator wearing the advanced aircrew protection system of the present invention with certain portions removed for clarity of presentation.

FIG. 2 is a perspective illustration of the system shown in FIG. 1 including a schematic diagram of the control and support and support mechanisms for the system of FIG. 1.

FIGS. 3A and 3B are front and side elevational views of a portion of the aviator and system shown in FIGS. 1 and 2.

FIGS. 4 and 5 are front and side elevational views of the outer suit of the system of FIGS. 1–3A and 3B.

FIGS. 6, 7, 8 and 9 are front and rear elevational views of the upper and lower inner bladder layers of the system of FIGS. 1–3A and 3B.

FIG. 19 is a cross-sectional view of part of the suit assembly of the system of FIGS. 1-15 showing the inner and outer layers.

Similar referenced characters refer to similar parts throughout the several figures.

DETAILED DESCRIPTION OF THE PREFERRED EMBODIMENTS

Overview

Figure 10:
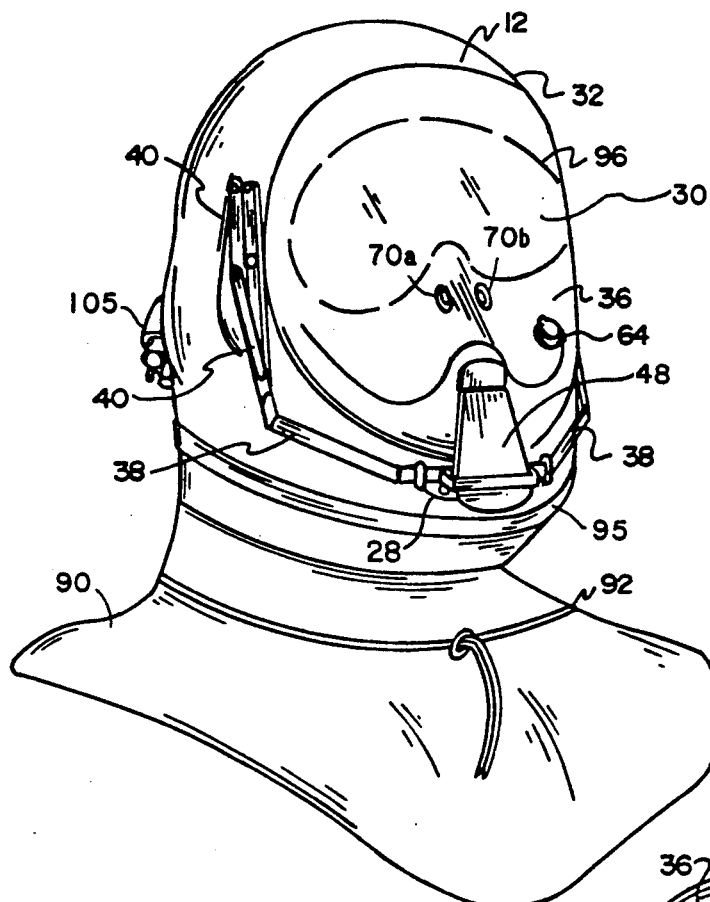
FIGS. 10 and 11 are perspective views of the helmet and neck shroud of the system of FIGS. 1 through 3 showing the faceshield in the lowered and raised positions.

With reference to the various Figures, particularly FIGS. 1-2, there is shown an advanced aircrew protection system (APS) 10. The system includes a full pressure helmet 12, mask, a neck shroud 13, a partial pressure suit 14, and control means 16 together with various connecting elements.

In the following discussion, reference is made to the several bladder areas and other pressurized areas within the suit assembly which are labelled as follows: helmet (HE); mask (MA); chest bladder (CH); arm bladders (AR); glove bladders (GL); abdomen bladder (AB); leg bladders (LE); and ankle and boot bladders (BT). See FIG. 14 for complete labeling.

More particularly, the APS system of the invention includes a partial pressure suit having inflatable upper bladders (CH, AR, GL) and inflatable lower bladders (AB, LE, BT), a full pressure helmet assembly including an oral nasal mask mounted within the helmet, such that the helmet completely covers the head with the mask defining a breathing volume (MA) at the nose and mouth separate from the remainder (HE) of said helmet, and a neck shroud for joining the helmet to the suit in a pneumatically sealed relation to the helmet and to the neck of the wearer.

Means are provided for connecting said upper bladders (CH, AR, GL) and oral nasal mask (MA) together to a source of breathing gas under a first pressure, and, further means are provided for connecting the lower bladders (AB, LE, BT) to a source of fluid under a second pressure. Control means are provided for controlling the first and second pressures according to appropriate schedules for the various combinations of acceleration forces and altitude to be encountered. The helmet and shroud volumes exclusive of the mask separate from the other areas and are pressurized by an aneroid restriction of demist gas outflow.

Suit Assembly

The suit includes three elements: the outer restraint layer, the underlayers including and a first impermeable layer, and an additional layer of impermeable material bonded to the impermeable layer to form bladder areas over selected areas.

The outer restraint layer covers the arms, legs, and torso exclusive of the head and neck, and exclusive of the hands and feet. The restraint layer is a non-stretchable fabric having as a primary function the protection of the layers underneath, to protect the crew member with a certain amount of abrasion resistance and from low energy shrapnel. It also houses pockets, zippers and enclosures for crew use. It provides a structure against which the underlayers, when inflated, will be restrained and constrained from moving, allowing them to give counterpressure to the wearer's body.

The first impermeable layer is underneath the restraint layer and covers the same area as the restraint layer except that it does extend over the feet, but it does not cover the hands and it does not cover the head and neck.

Means is provided for forming bladders with the first impermeable layer and include areas of flexible and impermeable fabric bonded to the first impermeable layer over selected areas of the suit to form the previously identified plurality of bladders. These comprise the upper bladders CH, AR, GL and the lower bladders AB, LE, BT.

Thus, bladders (LE) encircle the legs, and connect with the bladders (BT) that go down into the boot, over the feet (FIG. 8) area under the arch (FIG. 9) and are also connected with the abdominal bladder, (AB). A chest bladder (CH) is formed to cover the chest area and is connected with bladders (AR) for the shoulders and arms and extend down to the wrists. At the wrist there is a tubing interconnect for interconnecting the bladders (AR) to the gloves on the hand when inflatable gloves with bladder (GL) are worn.

The upper bladders CH, AR, GL and lower bladders AB, LE, BT are independently pressurized on different schedules. This serves to functionally divide the suit assembly 14 into an upper portion 14a and a lower portion 14b (FIG. 14) each having bladders which include the features necessary to provide high altitude protection upon loss of cabin pressure, acceleration protection during high-turning acceleration (high-G) maneuvers, protection from windblast during ejection, and a protective barrier against toxic agents. The suit assembly 14 also distributes ventilation air to a crewmember wearer and provides anti-exposure protection, in the event of cold water immersion.

In addition, a distribution block is attached to the suit, through the impermeable layer and through the restraint layer. This block distributes breathing gas to the chest bladder CH and up to the helmet mask volume HE. The block also acts as a pass-through for demist and sensing lines and communication wires.

The partial pressure suit 14 combines the functions of suit pressurization for high-G protection and altitude protection along with CB and exposure protection. While two-piece suit concepts were investigated during the system design in the present invention, the one-piece suit is preferred and avoids concern about a complex seal between the jacket and trouser to provide CB and anti-exposure protection and the need for additional restraint and hold down elements.

Thus, the suit includes an essentially full coverage, impermeable liner 112 which is preferably constructed of polyurethane coated nylon. A second layer of this material which forms the pressure bladder 114 is sealed to the liner in areas where pressurization is required. The pressurized areas include the entire legs, feet, abdomen, connecting channels between the legs and abdomen below the waist FIGS. 8 & 9 and above the waist, chest counterpressure bladder, the entire arms, and connecting channels across the shoulders between the chest bladder and arms FIGS. 6 & 7.

If the aircraft loses cabin pressure at high altitude, the entire suit is pressurized to 3.5 psi. The pressure is either applied directly to the body by the bladders or by the bladders tightening the fabric on the body. In this manner, the entire body is either pressurized or contained during exposure to low atmospheric pressures.

The impermeable layer or liner 112 terminates at the wrists and is sealed due to an overlap interface with the gloves or rubber wrist seals (not shown). The neck is sealed due to the interface of the helmet neck shroud 90 with the suit or separate silicon neck sealer (not shown). The feet include impermeable boots integral to the liner 112 to provide protection against water intrusion. The impermeable layer also serves as a barrier to CB agents, whether in liquid or vapor form.

Pressurized mobility of the partial pressure suit is ensured through the use of patterned mobility joints 118 in the knee and elbow area of the suit. These joints are patterned to take the shape of the wearer in the nominally seated position when pressurized. They allow adequate mobility for the wearer to reach all necessary controls, switches, etc.

The outer shell, or restraint layer 116 of the garment is conformally fitted to restrain the pressure bladders and provide restraint over the unpressurized areas of the body. Snaps 120 releasably couple the impermeable liner with respect to the restraint layer.

A conformal custom fit is provided by sizing panels 122 along the sides, legs, shoulder, and sleeve out seams. The outer shell of the partial pressure suit is preferably constructed of NOMEX/KEVLAR fabric and webbings for dimensional stability, durability, and fire protection. NOMEX and KEVLAR are trademarks of E.I. DuPont de Nemours of Wilmington, Del. for aramid fibers.

The preferred candidate material for the restraint layer is composed of a 2.25 ounce per square yard nylon fabric coated on one side with 2.25 ounces per square yard of heat sealable polyurethane. The fabric conforms to MIL-C-87178, Type 1 and is presently being used in the construction of military inflatable decelerators.

Because this is the outside of the garment, it is desirable for the fabric to possess good durability and aesthetics, flame resistance, and dimensional stability.

NOMEX and NOMEX blend fabrics have traditionally been used for flight suits, due to their flame resistance and durability. One hundred percent NOMEX fabric has been evaluated as the restraint fabric for the APS suit, but was found to possess too much elongation for this particular application. A blend of 95 percent NOMEX/5 percent KEVLAR was subsequently evaluated, and the small addition of KEVLAR provided an acceptable amount of reduced elongation and penetration resistance. This fabric conforms to MIL-C-83429, and is a 4.3 ounce per square yard plain weave, produced from DuPont Type 452, sage green, spun NOMEX/KEVLAR fibers. It is flame resistant, durable and readily available. At the present time, it is the preferred material for the restraint shell and neck shroud restraint, based upon its weight, elongation and performance, although other alternatives will be discussed in the following paragraphs.

The suit is pressurized according to two requirements. During high gravity (high-G) maneuvers, the legs, feet, abdomen, and connecting channels are pressurized to reduce blood pooling in the legs and provide thoracic support. Simultaneously, although on a different pressure schedule, the chest counterpressure bladder, arms, and connecting channels are pressurized to counteract the pressurized breathing gas and reduce blood pooling in the arms. An external layer 116, essentially co-extensive with the internal layer, limits the extension of the bladders.

Referring to FIG. 5, the gasses to the various functioning portions of the system is conveyed by tubes, hoses or lines 60. The tubes are elongated, cylindrical members with an exterior or restraint layer 130 of the same material as that employed in the restraint layer of the suit assembly. Within the exterior restraint layer 130 and co-extensive therewith is an impermeable liner or layer 132 in contact with the exterior layer. The impermeable layer is preferably fabricated of the material of the bladder. When conveying fluids, the tube will assume a right circular cylinder cross-sectional configuration. When, however, no fluid is being conveyed the tube will assume a flat ribbon like configuration.

The hose for the lower suit or the lower compartment of bladders exits the suit in the abdominal area.

The suit also has a break through the restraint layer and through the impermeable layers to a chest diverter manifold 124 which provides distribution of ventilation air to the suit and the chest area. The manifold forms a pad over the chest and back. The pad is of bladder material covering a three dimensional spacer such as tri-lock filler. Three dimensional spacer fabrics are used in garments to facilitate air flow and provide comfort to the wearer. Numerous styles are available and for this application a very low profile spacer fabric is desirable from a flexibility/comfort standpoint. The vent pad acts as a manifold with peripheral apertures to distribute conditioned air from the thermal conditioning unit or the portable ventilation system over the upper torso to provide cooling. The pressure bladder layer incorporates one-way flapper valves 126 to facilitate ventilation exhaust flow without compromising exposure protection. The construction is such that the pressure bladder layer and ventilation system can be removed from the restraint layer for maintenance.

All hoses and the block are strategically placed so that the harness can interface with the suit. This is the harness that attaches the crew to his parachute and his ejection seat. The harness does not impinge on any of the hoses so that there is no compromise of function. In addition, survival vests and floatation gear must be placed so that they interface and do not interfere with the hoses.

The hands are covered by the either conventional gloves or gloves that have bladders GL over the back of the hand and fingers and which are interconnected with the bladders AR that go down around the arms.

The impermeable material that cover the ankles and feet is restrained from expanding by conventional aviator's boots.

Shroud

The full helmet assembly 12 includes a flexible, pressurizable neck gauntlet or shroud 90 to complete the pressure enclosure between the base of the helmet 12 and the base of the neck of the user.

The base of the helmet shell 32 incorporates a channel 91 designed for attachment of a sealing ring 93 and clamping ring 95 incorporated on the top of the shroud 90. The shroud 90 incorporates a reduced section in the neck region to reduce lifting force and enhance head mobility when pressurized.

The purpose of the neck shroud 90 is to provide chemical/biological and anti-exposure protection and pressurization to the crewman in the head and neck area. It works in conjunction with the helmet and a neck dam 97 which is used to provide a seal at the neck.

The helmet is interconnected with the upper collar of the suit 291 by a neck shroud 90 which creates an annular neck seal 292 and forms a gas chamber 294 in communication with the helmet 12. The neck shroud 90 is attached to the base of the helmet 296 extends in two layers down under the suit collar and returns upwardly to an elastomeric seal around the neck. While helmet can be worn with or without the neck shroud, the neck shroud is necessary whenever high altitude protection is required or chemical agent protection is required or cold water emersion protection is required. When used as a complete system, the wearer places on his head through the neck shroud which interfaces with the suit by sliding under the collar 291 of the restraint layer 116 of the suit.

The shroud serves to isolate the head and neck from ambient air and from the suit and any chemical agent that may have gotten into the suit. The intent is to provide full pressurization to the head. It's a full pressure compartment within the helmet except for the separate compartment of the oral nasal mask. The shroud is meant to be removable, in concert with the modular nature of this system. The shroud comprises a restraint layer and an impermeable layer that are joined at their origin which would be at the underside, underrim, of the helmet where they are sealed by a captured ring to the base of the helmet. They extend downward from the helmet under the collar of the restraint layer of the suit where they reflex outward over the shoulders, backward over the back of the back and forward over the chest. They continue about 1/5 of the way down the back and over the front of the chest.

This shroud 90 consists of an outer fabric restraint layer 298 and an impermeable layer 300. At the lower end the layers turn downwardly and outwardly where they are captured under the suit assembly 14 through the neck opening. A draw string 92 is formed in the upper end of the shroud at the wearer's neck to provide a narrowing pinch zone for neck turning at low inflation pressure. The base of the impermeable layer in the neck shroud reflects back at 304 from the shoulders, upper chest and upper back and terminates at a circular silicon rubber diaphragm seal 302 which seals the helmet from the suit and ambient air.

Because chemical agent resistance is required, the optimum choice of material for the neck shroud impermeable bladder layer is urethane coated nylon. Certain urethane formulations are known for excellent impermeability to chemical warfare agents and are used in many items for the military and may be used here.

Helmet

The helmet itself, is a dual compartment helmet, it has a oral nasal compartment that is bounded by the wearer's face and a oral nasal mask. The remainder of the helmet compartment is the dead air space around the individuals head outside of the oral nasal mask area. The helmet has an opening in the front which is covered by a transparent, faceplate moveable from the opening by a cantilevered type of mechanism that raises to an open stored position or a closed functional position. The mask is attached to the faceplate and, as the faceplate is lowered by this cantilevered mechanism, the mask is brought to bear against the crew's oral nasal area. The helmet is adjusted for fit for the individual after the faceplate is closed through a tensioning mechanism that moves the earcups inward against the head and a nape pad against the back of the head. The nape pad in addition has a counterpressure bladder within its structure that pushes against the back of the head to prevent the escape of high pressured gases from the oral nasal mask. But, normally, the mask is not pressing very hard against the face of the individual.

The helmet has fitting pads that can be placed in the occipital and the crown of the helmet and in addition if required fitting pads can also be placed on the outside of the earcups. They are held in place by a VELCRO fastening mechanism.

The helmet has a spray bar which is fed by the same air that feeds the ventilation which is a toxic filtered air supplied and it's purpose is to keep the faceplate free of fog and it's called a demist line or demist air. This air normally exits through the left rear of the helmet through a aneroid valve that is set to close and maintain the pressure of 3.5 psi absolute This will pressurize the helmet only when the neck shroud is worn and if the pressure goes below 3.5 psi. All services enter the right rear of the helmet which is a position that is least incumbering on the mobility of the head and least interference by the ejection seat in the cockpit.

The services from the helmet are supplied from the chest block 59 which is also doubles as a distribution manifold to the upper bladders and the mask. Most of the lines except for the opening into the upper bladders are just pass through. The upper block also has an opening that is normally closed off by a large metal plug. This opening is for insertion of a standard NATO chemical agent filter during ground egress when the pilot is not hooked up to any aircraft services The helmet is also provided with holddown retaining lines attached to the front and aft portion of the suit by an adjustment mechanism that is located on the front so that during pressurization and during ejection and high wind blast the helmet is not lost nor does not raise from the crew's head due to inflation of the neck shroud and suit. The retaining lines have swiveled pulleys so that, even under pressurization, the pilot can still turn his head.

The key design objectives for the advanced protection system (APS) helmet assembly 12 are to incorporate both positive pressure breathing capability for high g protection and full head pressurization for high altitude protection in a lightweight operationally usable helmet 12. This is achieved by incorporating a nosecup or mask 26 in the helmet, together with an occipital bladder for tensioning of the mask to the face in order to isolate the pressurized breathing gas from the remainder of the helmet; and a mechanial latching mechanism, sealing faceplate 30, and neck shroud 97 that retains pressure when the helmet 12 is fully pressurized. The helmet 12 is lightweight, approximately 3.5 pounds when completed, with the center of mass essentially in line with the cervical spine of the wearer.

The structural foundation of helmet 12 and, to a significant extent, the functional interface of the protective components is a pressure molded composite shell 32 of woven fabric and epoxy. The fabric is woven from a fiber of high tensile strength and low elongation such as KEVLAR (trademark name for an aromatic polyamide fiber of extremely high tensile strength and greater resistance to elongation than steel, of E.I. duPont de Nemours of Wilmington, Del.).

This results in a very strong, lightweight composite. Secondary operations in the mold include pressure bonding of pre-molded duct work 34 of the same composite. This further enhances the strength of the helmet shell in a functionally effective manner.

Figure 11:
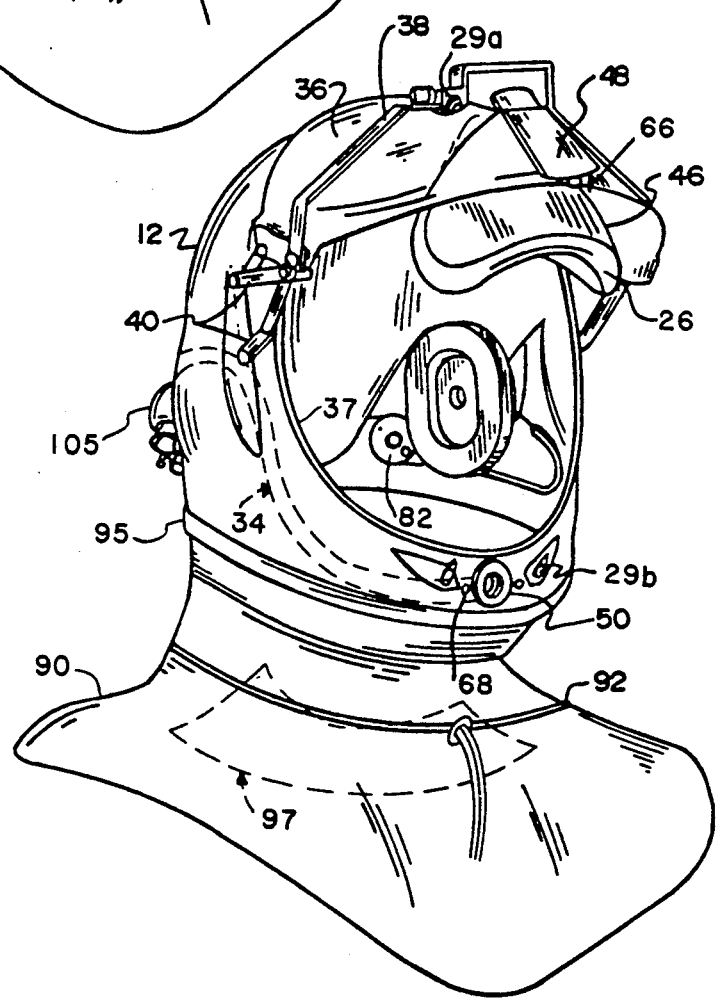

An optical quality injection molded polycarbonate facepiece 36 is installed in the frontal opening 37 of the helmet shell 32 in a manner which permits it to be rotated from a lowered, operative closed position to a raised, essentially horizontal, inoperative and open position. This motion is controlled by the latching mechanism 28 including a bailer bar 38 and two control linkages 40 (FIGS. 10–11) which in combination produce a near linear initial opening direction, followed by combined rotation and backward movement which eliminates unnecessary and undesired excess protrusion from the helmet shell 32 in the open position. The same linkages 40, by geometric configuration, provide an approximate seven (7) to one (1) mechanical advantage of closing force vs. force applied to the bailer bar 38.

Pressure integrity of the shell 32 and facepiece 36 in the closed position is provided by an elastomeric lip-type seal 42 bonded to the opening 37 of the shell 32. The latching mechanism 28 is provided with a pair of redundant automatic latching, quick release bayonet-type sockets 29a which interface with bayonet pins 29b on the shell 32.

The facepiece incorporates an oral nasal mask 26 to facilitate pressurization of the breathing gas independent of the pressure inside or outside of the remainder of the shell 32. The mask interfaces through a hard shell 46 and an opening in the facepiece 30 to a valve assembly 48 installed on the outside of the facepiece 36.

The valve assembly 48 is a multi-function device incorporating a hollow probe conduit (not shown) which interfaces with a sealed opening port 50 in the helmet shell 32 by which breathing gas is supplied to the valve assembly 48. Breathing gas is supplied from multiple connector 105 through duct 34 to port 50 through a probe conduit extension of valve assembly 48 to the oral nasal mask 26. A combination inhalation and pressure compensated exhalation valve 54 (FIG. 14) is contained within the valve assembly 48. A very small negative pressure in the oral nasal mask 26 relative to the breathing air supply pressure, produced by inhalation, opens a port in the valve 54 (FIG. 14), thereby providing an inhalation flow. A small positive pressure relative to the supply pressure, produced by exhalation, stops the respiratory flow and opens a port, thereby providing an exhalation flow which is ported outside the assembly. The configuration of the elastomeric diaphragm in the valve 54 (location shown only) prevents free flow through the valve by providing a light positive closing force on both the inhalation and exhalation ports. The diaphragm (not shown) is further configured such that the opening and closing of the exhalation valve (not shown) is not effected by a difference in pressure between the breathing gas supply and the pressure external to the exhaust port.

The exhalation flow is ported through a 35 in the valve assembly 48 to the outside environment. This feature provide a small reservoir that insures that any small transient back flow which could occur on reversal of pressure and closing of the exhalation valve (not shown) is exhausted air as opposed to potentially toxic air from the outside environment.

The valve assembly 48 also incorporates an anti-drown valve 56. This valve 56 is designed to open to admit ambient air directly into the port interfacing to the oral nasal mask 26. The closing spring force on this valve 56 is designed to permit the valve 56 to open only when the inhalation demand exerted by the user exceeds normal and contingency anti-suffocation flow rates. The normal supply is designed such that when functioning normally, the user cannot, by forceful inhalation exceed its capability. Should this supply be exhausted or cut off for any reason, an anti-suffocation valve (not shown) in the breathing gas supply hose or line 60 will open on forceful inhalation to admit ambient air through an optional toxic gas filter 61 which may be installed in distribution block 59 which is connected directly to the upper bladders and through hose 60 to the helmet 12 at connector 105. The anti-drown valve 56 is adjusted to open when the anti-suffocation flow is blocked. This is anticipated to occur only when the user is in the water, as would be the case on ejection from the aircraft over water. The anti-drown valve 56 derives its name from its primary function. The utility of the concept is clarified by the fact that provision must be made to admit breathing air to the helmet from the highest point feasible in the case of water immersion and that the preferred filtered contingency air source, by virtue of the size and weight of the filter, could not be accommodated on the helmet 12.

Figure 12:
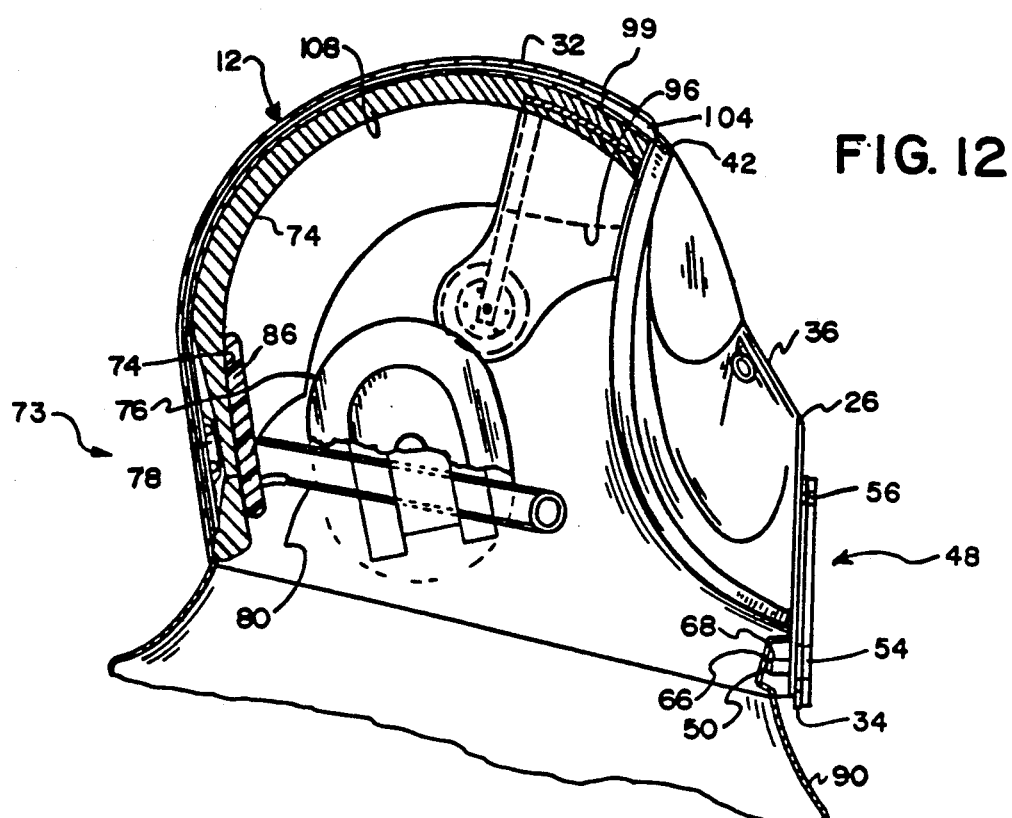
FIGS. 12 and 13 are side and front elevational views, partly in section, of the helmet shown in FIGS. 10 and 11 including the neck shroud.
Figure 13:
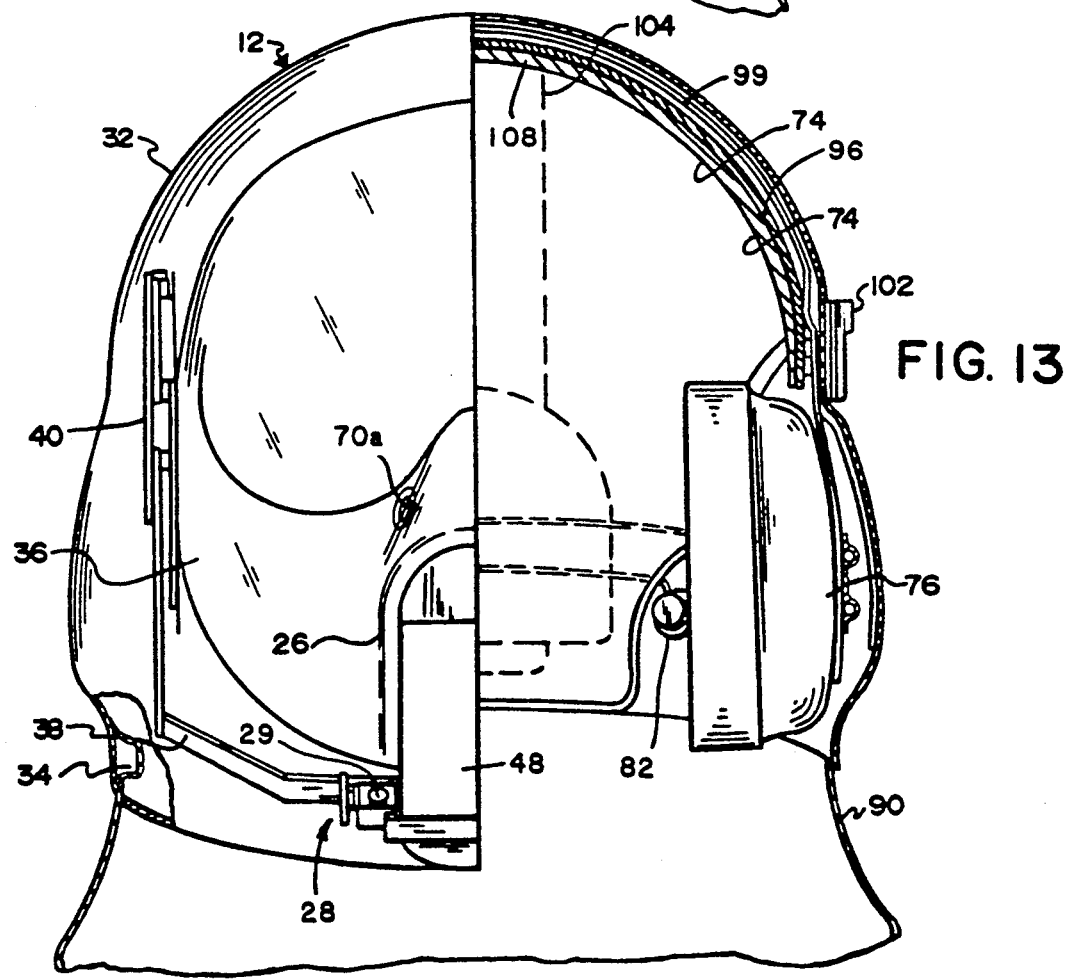

Other functional components associated with the oral nasal mask 26 and facepiece 36 are a microphone (not shown), a drink tube and port 64, and a valsalva devices 70a,b. The microphone is fitted into a molded cavity within the oral-nasal mask 26. The electrical conductors are passed through the wall of the mask 26 to a connector by which they pass through the facepiece 36 to the valve assembly 48. Another set of additional conductors are routed through the valve assembly 48 to projecting pins 66 FIG. 12 which engage sockets 68 on the exterior of the helmet shell adjacent to the breathing gas port. Additional conductors are routed along the inner wall of the helmet shell 32 to join conductors from the headset and then through the helmet shell 32 into the multiple connector 105 by which all support systems interface the helmet 12. All pass-throughs are sealed so as to be gas tight.

The drink tube 64 consists of a small formed elastomeric tube configured to be accessible to the mouth and to interface with a short rigid tube which is installed through a boss molded into the wall of the oral nasal mask 26. An additional elastomeric tube interfaces between the mask 26 and a drink port 64 installed through the wall of the facepiece 36. The drink port 64 is a self-sealing type such as to maintain helmet 12 pressure integrity.

The valsalva mechanism 70 provides a means to pinch the nose of the user closed for forceful equalization of pressure in the middle ear. It consists of two openings in the oral nasal mask 26 support structure by which diaphragm sealed plungers installed in the facepiece 36 can be driven into the oral nasal mask by two fingers of the user with a result that the mask pinches in against the sides of the nose.

The extremely high-G forces imposed on the aircrew by advanced aircraft require that the helmet not only be as light as possible, but also that it be well and securely fitted and have a center of mass as far back and low as possible. Other factors relating to these requirements are effective seal of the oral nasal mask 26 to the face, hold down of the helmet 12 by cable assembly retention lines 13 (FIG. 3A) when pressurized, retention of the helmet 12 on ejection from the aircraft, and maintenance of effective optical interface with various helmet mounted sighting devices.

A custom fit is accomplished by using fitting pad spacers (not shown) in the crown and nape 73 of the helmet. In addition, security and stability are provided by the headset earcups 76 and an inflatable occipital bladder in the nape pad assembly 78 which is hinged to the crown of the helmet 12 (FIG. 11) and cinched against the head after donning through an adjustable length cable 80 circumscribing the lower area of these components. The cable 80 length and consequent pressure on the head is adjustable by the user by means of a capstan 82 in the lower, left rear quadrant of the helmet 12. The capstan 82 is operated by a lever (not shown) secured to a sealed shaft (not shown) through the helmet shell 32. The action is an incrementally ratcheted cable take-up with a reverse position for quick release.

The oral nasal mask 26 is supported within the facepiece in a manner that permits convenient change out of sizes and both vertical and fore and aft adjustment for proper fit to individual crewmen.

The capability to pressurize the oral nasal mask 26 independent of the helmet 12 or shell 32 or ambient pressure addresses recent physiological findings that this enhances high-G tolerance. Pressurization is automatically induced by the aircraft breathing gas supply system in response to system sensed high-G's. Pressurization of the oral nasal mask 26 tends to force the face away from the mask 26 so as to induce leakage. It is, therefore, necessary to counteract this force. In that the forces are high, change very rapidly, and are involuntary, it is desirable to incorporate a counteracting force directly responsive to the pressure in the mask 26. This is accomplished by the installation of a pressure bladder 86 mounted in the nape pad assembly 78 which exerts counter pressure on the back of the head. This counters the increased pressure to the oral nasal mask. The bladder 86 is also pressurized from the breathing gas manifold 34 in the helmet shell 32.

Helmet hold down is accomplished by provision of attachment cable tie down points 87 on each side of the base of the helmet 12 (FIG. 3B). These are located in approximate line with the center area of the base opening so as to preclude a pitch force being induced by pressurization. The attachment points facilitate connection of an adjustable, articulating cable assembly 13 which interfaces with the aircrewman's restraint layer, the flight suit 14 (FIG. 3A).

A lightweight spherically shaped molded plastic sunvisor 96 is installed within the helmet shell 32 so as to rotate about a common axis of the sunvisor spherical segment and a slightly larger spherical segment 98 formed by the front crown of the helmet shell 32 and the upper optically clear region 30 of the facepiece 36. By this means, the sunvisor 96 is stowed in close proximity to the inner surface of the crown of the helmet shell 32 and can be deployed to close proximity to the optically clear area of the facepiece 36. It is of sufficient size as to allow the wearer to also wear eyeglasses therebeneath.

Actuation of the sunvisor 96 is accomplished by means of a sealed all position device (not shown) on the shell of the helmet.

The design and installation of the sunvisor 96 is such as to be conveniently replaced by a laser protective visor. Such visors are characterized by the incorporation of materials which discretely block transmission of light wave lengths common to laser beam emission.

A preformed structure 99 of the same composite material as the shell 32 is bonded in place to the inner side of the front crown of the shell 32 to form a protective cover for the stowed visor 96. It also adds rigidity to the crown of the shell 32, provides a support structure for the impact absorbent liner, and provides a duct 104 for directing de-fog gas flow over the optical area 30 of the facepiece 36. The de-fog gas flow is directed to the structure 99 from a port in the multiple connector 105 through an extension of duct 104 formed on the inner back wall of the helmet shell 32 by a bonded in-place preformed composite structure. This structure also contributes to the strength and rigidity of the shell 32.

A duct 34 on the internal wall of the shell 32 connects the breathing gas port 50 in the lower front of the shell 32 to the multiple connector 105. This duct 34 is comparable in construction and installation to the sunvisor cover structure and de-fog gas flow duct 104, and similarly reinforces the sides and lower frontal region of the helmet shell 32.

A third small port in the multiple connector 105 serves to sense pressure in the breathing gas duct 34 for the purpose of feedback to a fast response breathing gas pressure regulator destined for use as part of the support system of advanced aircraft. Some regulators may not need this sensing port.

An ancillary feature of the helmet 12 design is the provision for installation of currently operational nuclear flash protective goggles, not shown. Specifically, mounting points are provided for installation of quick release latches for the goggles over the facepiece 36. Installation of the latches does not impact function of the helmet 12.

A key factor in helmet shell material selection is lightness in weight, with a high strength. Glass fiber has traditionally been used as a reinforcing fiber in laminate compositions for helmet shells, due to its high strength, excellent dimensional stability and lightweight. Glass fiber is flame resistant, is available in a wide range of deniers and fabric constructions, and is inexpensive in comparison to the other fibers which will subsequently be discussed. One negative aspect of glass is its brittleness, which can result in fracture upon impact.

KEVLAR 49 fiber replaces fiber glass in many reinforcement applications and is currently used in many state of the art helmet shells. KEVLAR 49's tensile strength is fifteen (15) percent higher than "E" glass, and has a modulus nearly twice that of "E" glass. KEVLAR's density is forty (40) percent lower than "E" glass, making it significantly lighter. KEVLAR 49 is inherently flame resistant. In composite applications, KEVLAR 49 has demonstrated superior performance over glass and graphite in terms of fatigue life and crack propagation and performs equivalently to glass in some impact tests and is the material of choice.

The inner lining of the helmet shell is composed of a high energy absorbing foam material which will be molded to conform to the internal contour of the shell. This can be accomplished by using foam sheeting or a chemical foam. A cover 74 is placed over the foam liner 108 for comfort and cleanability. The preferred cover material is a lightweight coated fabric or leather.

The exterior visor of the helmet facepiece is full face and removable or movable in flight. The desirable properties of the selected visor material are that it be optically clear, shatterproof, abrasion resistant and distortion free.

One suitable faceplate material is a polycarbonate sheet sold under the designation CR39. Pittsburg Plate Glass Industries is the manufacturer of CR39, an allyl diglycol carbonate monomer. CR39 is a trademark of Pittsburg Plate Glass Industries of Pittsburg, Pa. It is noted for combining the optical properties of glass with the excellent mechanical, thermal, electrical and chemical resistance properties of thermoset material. It is widely used for prescription eyewear and has been evaluated for protective gas mask lenses. CR39 has excellent resistance to abrasion and chemicals. It is available from PPG in liquid form and is supplied to manufacturers who custom cast it into various forms. To produce a facepiece, the CR39 is cast into a sheet and then formed over a mold into the desired shape.

Polycarbonate is the most likely alternative for the helmet facepiece material. Aircrew helmet visors have typically been produced from polycarbonate material meeting the requirements of MIL-V-43511 and Fed. Spec. L-P-393. Polycarbonate is noted for its clarity, high impact strength and dimensional stability. It molds well, with very low shrinkage. Numerous grades of polycarbonate material are commercially available and can be obtained with the optimum blend of physical properties, including flame and abrasion resistance. Abrasion resistance can be further enhanced with the use of a protective coating in accordance with MIL-C-83409. Polycarbonate resin is readily available and is less expensive than the CR39 alternative.

The mask 26 serves as an oral nasal face seal and is the primary mechanism for breathing gas distribution retention of pressure in the oral nasal area for positive pressure breathing. It is composed of a molded rubber component which is attached to the facepiece. Several elastomeric materials may be used for this application including nitrile Rubber.

CB Undergarment

The suit assembly 14 also includes a chemical barrier (CB) 112, an optional protective (CB) undergarment 18 (FIG. 19) and partial pressure gloves 136 (FIGS. 3A, 3B). Flyer's boots 20 (FIGS. 1 & 2) and the harness/flotation assembly 22 (FIG. 2) are preferably current standard United States Air Force (USAF) items.

The CB undergarment 18 is an air permeable, lightweight, conformal fitting garment constructed of charcoal impregnated fabric. This garment is designed to provide a vapor barrier between the aircrew and chemical agents. The garment covers the torso and the limbs and maybe a one-piece construction as shown. The CB undergarment may incorporate a frontal zipper that extends from the neck opening toward the crotch.

The purpose of the CB undergarment is to provide a vapor barrier between the crewperson and chemical agents. It is desirable that the material used to construct the undergarment be lightweight and air permeable for added comfort. There are several different candidates for this application.

The primary material candidate for the CB undergarment is a carbon/NOMEX knitted fabric such as NOMEX PAJAMA CHECK fabric per MIL-C-43774. Other candidates include spherical adhered carbon fabric, activated carbon coated yarns, activated carbon filled materials, carbon saturated non-wovens, or pure activated carbon textiles. Many of these materials are already qualified for use in similar CB garments.

A lightweight liner may be incorporated inside the pressure bladder layer to provide added comfort to the wearer. For added protection, it is desirable that the fabric be flame retardant.

Partial Pressure Gloves

The partial pressure gloves 136 are similar to the MG-1 gloves used for many years by the USAF. These gloves are no longer available, therefore, the present gloves have been designed for the APS. The outer shell of the glove is constructed with a combination of leather, NOMEX and KEVLAR, with lacing strips on the top of the glove for sizing. An easement zipper 138 on the side of the glove is provided for donning. The glove is conformal fitting to the palm and fingers in their released position. Pressurization of the glove occurs in conjunction with the upper body bladders. The pressurization is conveyed to the gloves from the arm bladders at the wrist through a quick disconnect and a hose. The glove bladder is contoured to the natural curvature of the hand, and the restraint layer is patterned to maintain this shape when pressurized. An impermeable lightweight CB underglove is used as required for CB protection. This CB underglove is designed to seal under the CB/exposure cuff of the upper body garment. A lightweight cotton comfort glove worn under the CB glove is provided for aircrew comfort and ease of donning. The standard aircrew flight glove is used when CB, exposure, and altitude protection are not required.

In order to achieve a secure seal which will provide protection from gas and liquid entry into the suit, a tight-fitting elastomeric material must be used for cuffs. There are two primary types of material that can be used for this application. One is a neoprene latex rubber dipped and cotton flocked material. It has been used on anti-exposure suits for wrist, leg and neck seals. The second material is a soft neoprene closed cell sponge rubber with lightweight nylon fabric laminated to one side. It is typically used as wrist, neck and leg seals on divers suits.

Although the dipped cotton flocked material has a thinner profile, the ⅛ inch thick neoprene sponge is more comfortable and conformable to the body, and is the optimum choice for the cuffs. It is also more available and less expensive than the dipped material, which is usually run on a custom order basis. Another approach is to provide a seal by simple overlapping of glove and sleeve impermeable layers. Although this does not make a perfect seal, it should be adequate for most applications.

Composite Assembly

The suit assembly system of the present invention is connected to source PI of air under pressure which is normally engine-bleed air operating through an anti-gravity valve 150 (FIGS. 2, 15) to provide pressurized air to the lower portion of the suit assembly 14 through hose 208 (FIG. 2).

A second source of fluid P2, preferably oxygen, is fed through a breathing or oxygen regulator 146 (FIG. 2, items A-E and FIG. 15) through hose 218 to the upper portion of the suit assembly and to the oral nasal mask 26 of the helmet assembly 12.

Under the adverse condition of low altitude (cabin pressurized) but high gravity, the anti-gravity valve 150 will detect such conditions and provide an appropriate amount of engine bleed fluid PI to the lower bladders AB, LE, FT of the garment in accordance with a first schedule. In addition, the output of the anti-gravity valve 150 will provide a signal to the oxygen or breathing regulator for directing the appropriate flow of oxygen from the second fluid source P2 to the upper bladders of the garment CH, AR, HA and to the oral nasal mask ON of the helmet according to a second schedule derived from the first schedule. There is no helmet pressurization required because the cabin is pressurized;

although demist gases DE passes through the helmet and aneroid valve.

Under a second adverse condition, that of high-altitude (cabin unpressurized) and low gravity, the breathing regulator will provide appropriate oxygen to the upper bladders CH, AR, HA of the garment and to the oral nasal mask MA of the helmet in accordance with a third schedule. In addition, the output of the breathing regulator will provide a signal to the anti-gravity valve for providing engine-bleed air to the lower bladders AB, LE, FT of the garment. Also, the outlet aneroid in the helmet will close thereby trapping demist gas DE within the helmet HE to maintain pressurization. In the event that the aircraft is disabled and engine bleed air for the lower garment bladders AB, LE, FT is unavailable during cabin decompression, the oxygen from the second pressure source P2 will provide the pressurized fluid as needed to the garment bladders below the waist from a connection within the composite assembly 16.

Under the adverse condition of high altitude and high gravity, the system will function as described above with respect to the high altitude, low gravity condition.

In addition to providing these two normal major functions, the present advanced protection system also provides for chemical agent protection and thermal/climatic maintenance (temperature control and cold water emersion protection) as well as the normal flight suit functions.

The following summarizes the above discussion and provides a basis for the detailed explanation which follows.

A NORMAL OPERATION
1. Mask provides mixture of air and oxygen through a common inhalation/exhalation valve.
2. Demist conditioned air flow over faceplate and sun/laser visor and is free to flow out of the helmet through an aneroid controlled valve.

B. HIGH G, LOW ALTITUDE/PRESSURIZED CABIN OPERATION
1. Mask provides pressurized gas/oxygen by breathing regulator according to second schedule.
2. Demist flow same.
3. Lower bladders provide pressure via anti g valve according to first schedule.

C. HIGH ALTITUDE/DECOMPRESSED CABIN
1. Mask and upper bladders provides pressurized gas/oxygen by breathing regulator according to third schedule.
2. Demist outflow restricted by aneroid controlled outflow valve approximating third schedule.
3. Lower bladders provide pressure via anti q valve according to same third schedule.

Neck shroud attached to helmet with neck seal provides helmet/head pressurization except oral nasal cavity. Mask provides pressure to oral nasal cavity for g and altitude protection.

The composite or control assembly 16 is the unit which directs all necessary fluid or gasses which are required to support suit operations. It distributes to the suit assembly pressurization air, breathing oxygen, demist air, and ventilation air. As shown herein, the composite assembly provides the appropriate pressure schedules to the various components of the suit system. It should be realized, however, that any number of commercially available components could be utilized singly or together in an integrated fashion to effect the same intended functional results.

Figure 14:
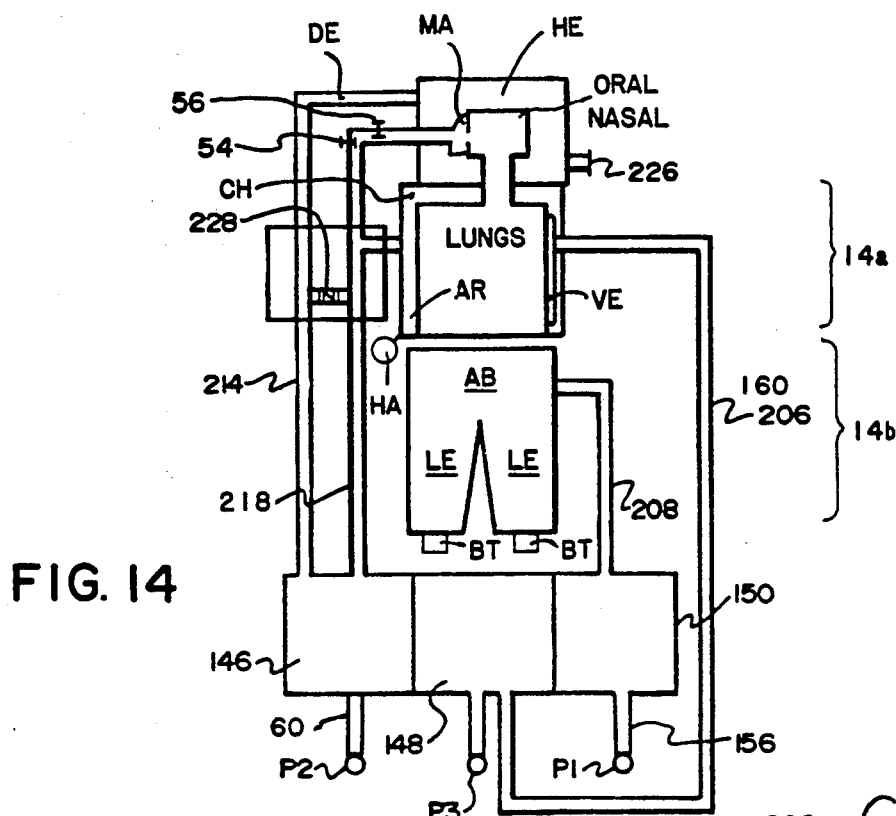
FIG. 14 is a schematic diagram of the entire gas distribution system of the system of FIGS. 1–13 and the composite assembly with the helmet and suit assemblies of FIGS. 1–13 the prior figures.
Figure 15:
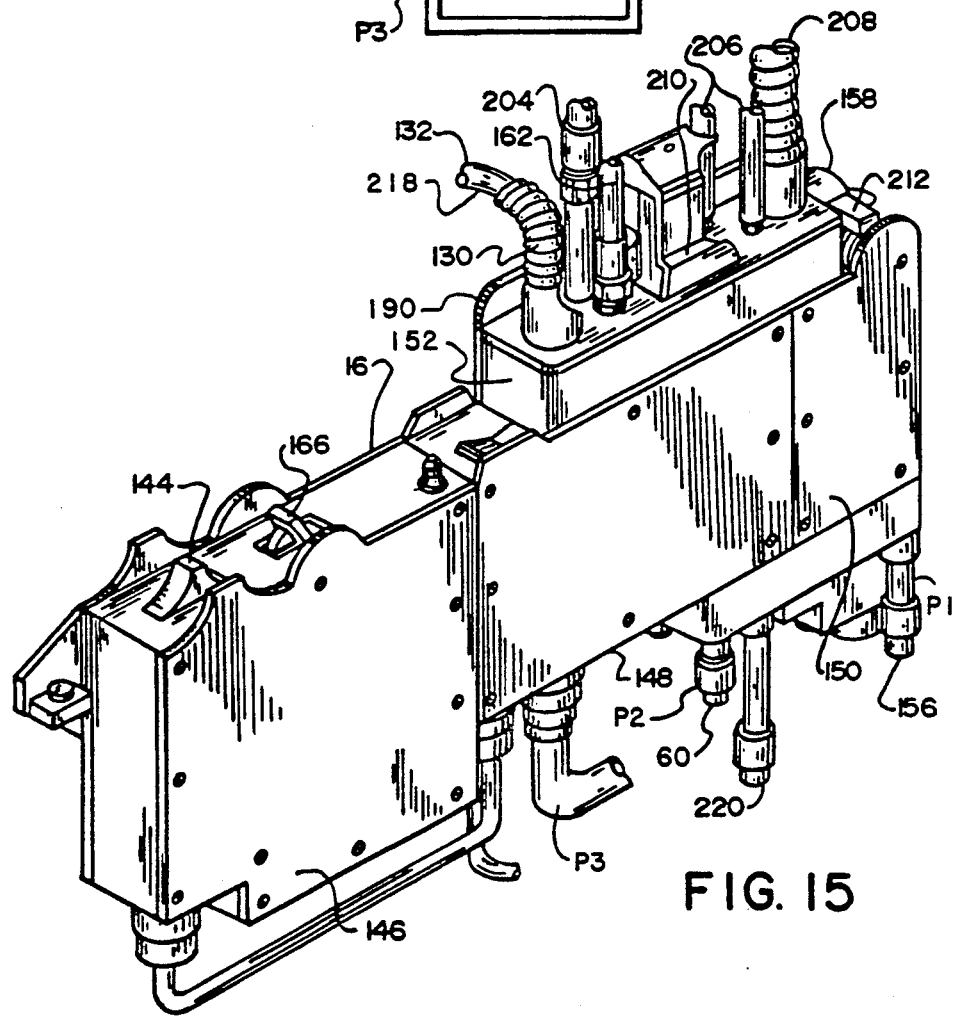
FIG. 15 is a perspective view of the control and composite assembly of the system of FIGS. 1–14 ready for mounting in the aircraft.
Figure 16:
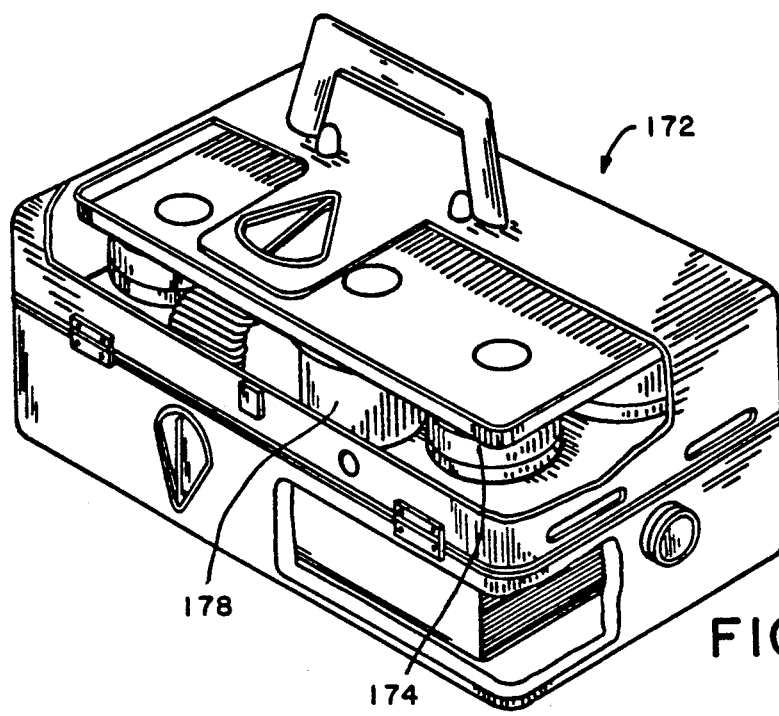
FIG. 16 is a perspective view of the portable air conditioning system for use with the system of FIGS. 1–15.
Figure 17:
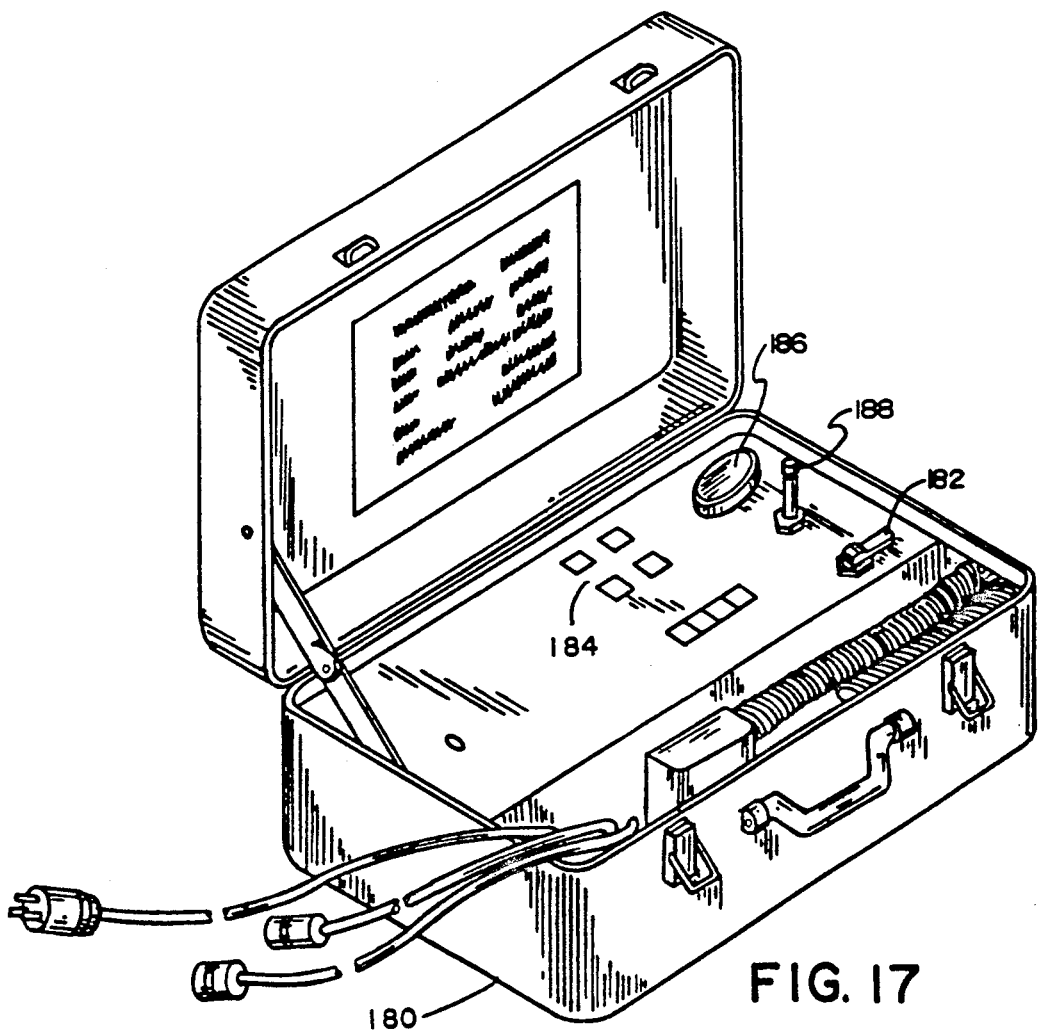
FIG. 17 is a perspective view of test apparatus for use with the system of FIGS. 1–15.

The composite assembly as shown in FIGS. 14 and 15 consists of separate components which securely interconnect to form a solid, rugged assembly which easily mounts to the crew member's seat or aircraft console. This assembly consists of the following:

A selector valve assembly 144 (FIG. 15) with manual and automatic controls to determine which source of gas supply (aircraft or emergency oxygen) is fed to the breathing regulator 146 and anti-G suit valve 150.

A breathing regulator 146 which pressurizes the counterpressure suit and supplies breathing gas to the crew member through the Personal Equipment Connector (PEC) 152.

A junction box 148 interconnects the flow passages between the regulator, selector valve assembly, and anti-G valve. Also, this component of the composite assembly contains aircraft service leads and suit vent air lines routed from the aircraft-to-seat connector to the PEC, attachment provisions for securing the regulator, anti-G valve and junction box housings together, and a breathing flow sensor.

An anti-G valve 150 which automatically pressurizes the G-suit as a function of G-loads and/or altitudes.

A single group integrated Personal Equipment Connector 152 (PEC) for communications and gas delivery.

The regulator selector valve assembly and anti-G valve assembly are each secured to the junction box with a single screw, with face seals and guide pins for location to insure ease of disassembly for servicing and complete interchangeability. This method of construction has proven reliable and rugged.

Each crew member is equipped with a seat mounted composite assembly which contains a miniaturized pressure demand regulator 146 which offers low resistance to breathing gas flow up to 200 liters per minute (1 pm) and operates at inlet pressure as low as 10 psig. The breathing regulator incorporates a press-to-test function, switchable safety pressure from ground level to 33,000 to 34,000 feet cabin altitude, automatic positive pressure breathing (PPB) above 33,000 to 34,000 feet in the cabin, and switchable G sensitive positive pressure breathing (PPB) capability.

In the altitude PPB mode, the regulator supplies gas at breathing pressure to the oral nasal cavity and chest counterpressure garment and provides for anti-G suit inflation equal to the breathing pressure. In the high turning acceleration PPB mode, the legs, feet, abdomen, and connecting channels are pressurized to reduce blood pooling in the legs and abdomen and provide thoracic support. Simultaneously, although on a different pressure schedule, the chest counterpressure bladder, arms, and connecting channels are pressurized to counteract the pressurized breathing gas and reduce blood pooling in the arms. Primary regulator design goals include high reliability, no operational field maintenance, and changeable PPB schedules.

The anti-G valve 150 is also part of the seat mounted composite assembly. The slim line configuration of the valve and the need to closely couple the anti-G valve to the breathing regulator in order to achieve automatic high altitude G-suit inflation dictated the selection of this design. The anti-G valve utilizes two sources of gas for its operation through line 156; the engine bleed air and the aircraft oxygen/emergency oxygen system gas. The bleed air is used to pressurize the suit when high gas flow rates and volumes are required.

When engine bleed air is not available, i.e., ejection or engine flame out, inflation of the lower bladders may be achieved with the aircraft or emergency oxygen system.

The anti-G valve 150 automatically senses the oxygen regulator operational pressure and provides for anti-G suit inflation to a predetermined schedule. This feature allows the anti-G valve to function as part of the positive pressure breathing regulator mode during high altitude operations.

The anti-G valve also incorporates a three position toggle switch 158 which allows the aircrew to select ready pressure or normal operation (no pre-pressure) modes. The third position is a manual hold down "press-to-test" mode which automatically returns to the ready pressure position when released from the test position. This selection position allows the aircrew to pre-inflate the anti-G suit to a nominal pressure of 0.2 psig for planned high G situations yet not be encumbered with the pre-pressure during routine flight. The system incorporates a pressure relief valve to prevent over inflation of the lower bladders.

The junction box 148 provides the interconnection of the PEC aircraft connector, emergency oxygen system connection, anti-G valve, and connection to the selector/regulator assembly. In addition, the junction box houses the line 160 for the flow of conditioned air to the crewmember. The electrical lines 162 for monitoring functions and communications are also contained in this portion of the composite assembly.

Chemical protection of junction box gas passages and sensing lines is achieved with molded rubber prop open check valves (not shown) which seal against a lip when the mating parts are not in position. When the mating part is in position, the annular face seal contacts the flat surface of the mating PEC and aircraft-to-seat connectors preventing outward gas leakage and inward contamination while a flow path, equal or greater than line size is formed around the propped open check valve.

When the PEC is not connected to the junction box, a spring loaded hinged cover 190 closes, providing safety protection from chemical contamination and dirt as well as physical protection from crew members or service personnel.

With the cover in a closed position, the prop open check valves in the sensing line, breathing line, anti-G line and cooling lines remain closed and the face seals on the anti-G line and cooling lines also seal against the underside of the cover. Another face seal on the underside of the cover surrounds the conditioned air and breathing gas ports while sealing against the top flat surface of the junction box. In this position, the cover does not seal against the individual face seals of the three ports and at the same time the cover props open the conditioned air line port. This sealing arrangement provides a purge flow of filtered air spread over all three ports when conditioned air is turned "ON" prior to raising the cover and attaching the PEC. This insures maximum chemical protection upon connection of the PEC junction box. A sensor 164 continuously monitors total gauge pressure and oxygen partial pressure (PO2) of the aircraft product gas. Output from this sensor lights a red "OXY" warning on the crew member's control panel and automatically actuates the emergency oxygen supply whenever either or both sensed pressures fall below prescribed limits. The sensor is designed for rapid response and high reliability, and will provide both warning and emergency oxygen system activation in primary failure modes.

Figure 18:
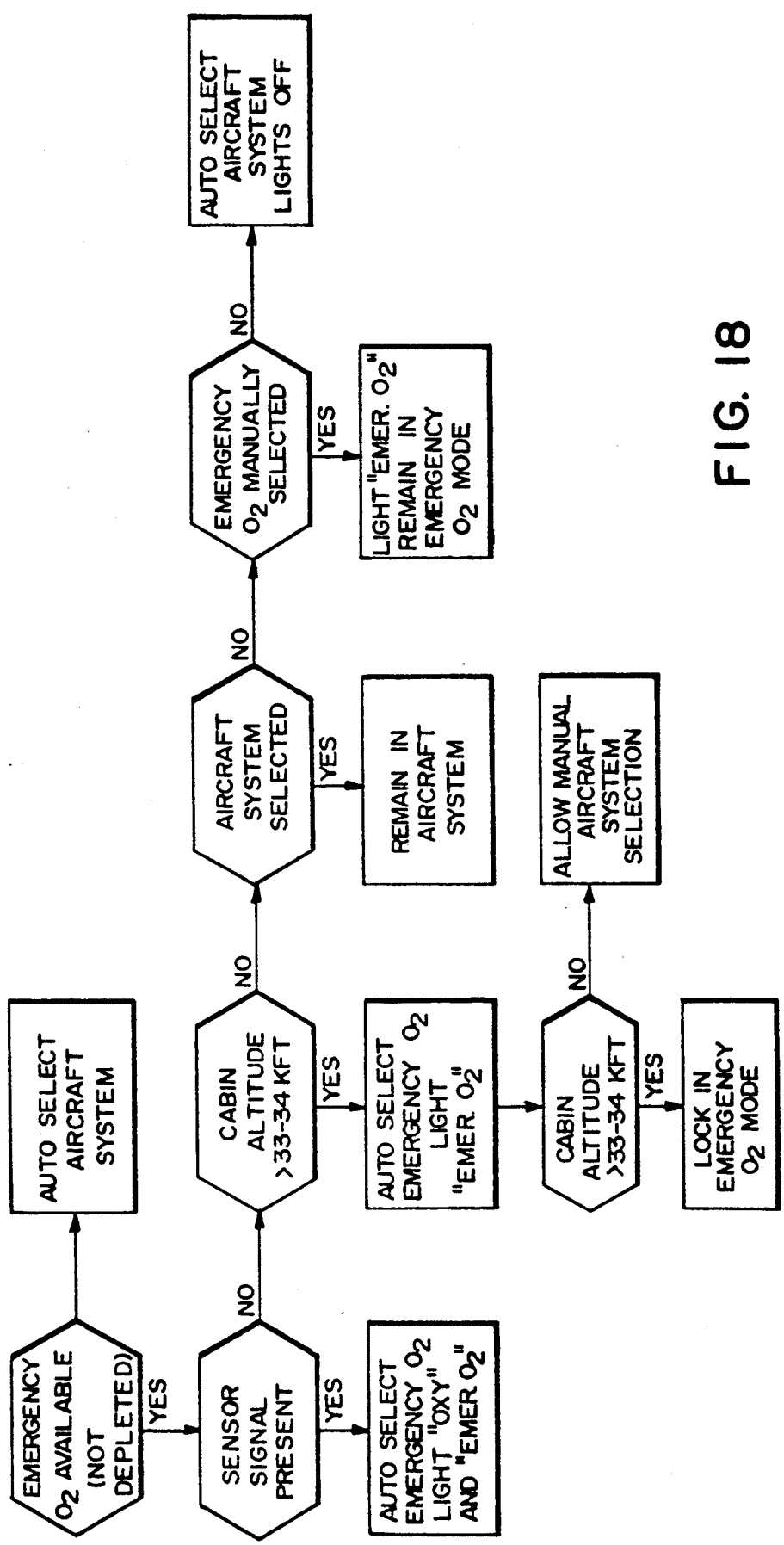
FIG. 18 is a flow diagram in block form of the controls of the system of FIGS. 1–15.
Figure 20:
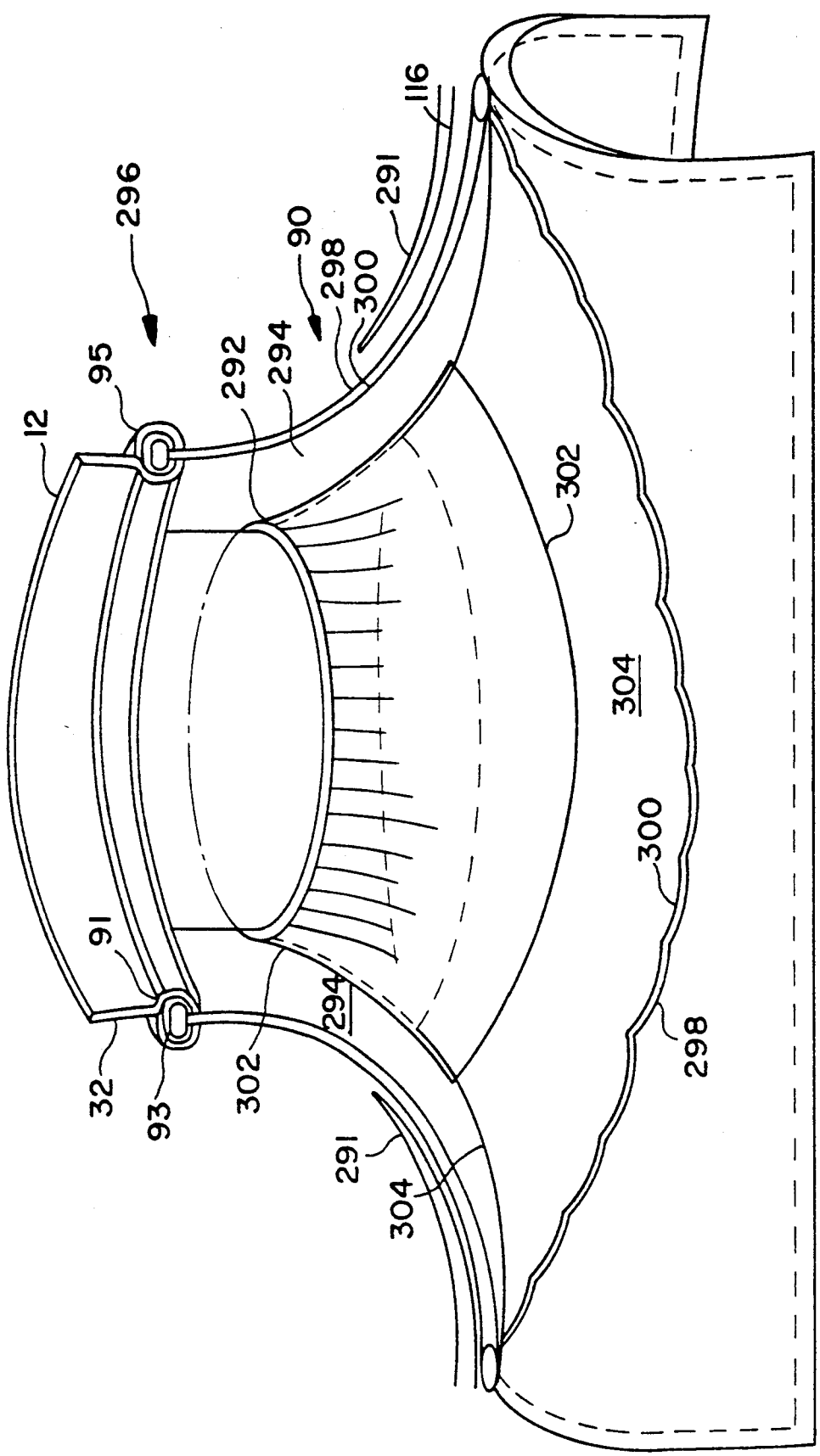
FIG. 20 is an elevational view, partly in cross section of the shroud of FIGS. 10-13.

The selector valves, either manually or automatically, select breathing gas supply from the aircraft oxygen system or from the emergency oxygen system (EOS). Automatic selection of emergency oxygen occurs upon signal from the oxygen sensor or upon cabin altitude exceeding 33,000 and 34,000 feet. Upon removal of the sensor signal below 33,000 and 34,000 feet, the valve automatically reselects the aircraft oxygen system as the breathing gas source. The crew member can manually override the automatic selection of emergency oxygen due to the altitude switch. The selector lights a green control panel "EOS FLOW" indicator while emergency oxygen is being supplied, and will not allow emergency oxygen to back flow into the aircraft product line. When the emergency oxygen is depleted, the selector valve automatically returns to the aircraft oxygen system function. Manual operation of the selector valve functions without electrical power. FIG. 18 shows the logic flow for the selector valve operation.

The PEC and its seat mounted receptacle forms a single point of connection to aircraft systems for all the aircrews personal life support and communications equipment. The PEC passes regulated breathing gas (aircraft or emergency oxygen), conditioned air, anti-G suit inflation gas, and communications wiring.

A breathing regulator press-to-test switch 166 allows the crew member to check mask seal, system integrity, and regulator pressure function. The selector control 144 manually activates/deactivates the emergency oxygen system and provides a third automatic emergency oxygen ("EOS AUTO") position. The "OXY" warning light indicates system pressure and/or $PO_2$ are below acceptable levels. The "EOS FLOW" light is illuminated while emergency supply is in use. The emergency supply indicator continuously registers percent of emergency oxygen supply remaining or emergency supply pressure. A flow sensor activates a blinker-type flow indicator to allow the crew member to monitor breathing pattern and system leakage. All controls and indicators are readily accessible and visible to the aircrew while in the normal cockpit seated position.

Operation

From an overview standpoint, the mode of operation of the present invention can readily be understood by considering FIGS. 2, 14 and 15. As mentioned above, oxygen is supplied to the oral nasal area of the helmet through line 60 which receives its supply from source P-2 through the oxygen regulator 146. While 100 percent oxygen may be utilized, it is preferred that about 95 percent oxygen and about 5 percent argon be utilized. Such mixture of oxygen and other gas or gasses for breathing purposes are considered to be oxygen for the purposes of this application. The fluid supply P-2 also functions through the oxygen regulator to provide pressurized fluid to the remainder of the helmet through the demist line 214. A one-way cross-over valve 228 couples the breathing line and the demist line to provide oxygen to the helmet in the event of a failure of the demist line. Pressure source P-2 may be the onboard oxygen system or the portable supply.

Pressure source P-1 provides pressurizing fluid to the lower portion of the garment through the anti-gravity valve 150 by line 208. Pressure source P-1 is normally the engine bleed fluid, air, of the aircraft but, in emergency situations, may be the onboard oxygen supply P-2.

In operation, a high gravity condition of 2 G's will initiate a first pressure schedule to continually increase the pressure in the lower portion of the garment linearly to 10.5 psi as a maximum of 9 G's is reached. In addition, the sensed pressure of the anti-gravity valve will send a signal to the breathing regulator and upon reaching the force of 4 G's, the breathing regulator will then provide pressure which increases linearly to 1.2 psi maximum at 9 G's according to a second schedule.

Under a second condition, that of high altitude and low gravity, the breathing regulator will sense this condition and, upon reaching about 33,000 ft. to about 34,000 ft. trigger the breathing regulator 146 to provide oxygen at about 3.5 psi absolute on a constant schedule. In addition, upon reaching the triggering altitude of 33,000 to 34,000 ft., a signal will be sent by the breathing regulator to the anti-gravity valve for providing pressurized fluid to the lower portion of the suit assembly to maintain a pressure of about 3.5 psi absolute, again on a constant third schedule.

Under the condition of high altitude and high gravity the breathing regulator and anti-gravity valve are configured so as to function as if in the high-altitude, low-gravity mode. In essence, if an adverse condition occurs in the lower altitudes, the anti-gravity valve controls. If an adverse condition occurs in the high-altitude mode, the breathing regulator controls.

Valve 226 is an outflow controller aneroid to bleed off excess pressurized demist fluid from the helmet. This maintains the general area of the helmet at a pressure essentially the same as that in the face mask area of the helmet for wearer convenience, safety and comfort. This is also important for counterpressure to the neck and maintains approximately equal pressure across the tympanic membrane of the ear.

In addition to the foregoing, the conditioned air supply is fed independent of the oxygen regulator 146 and anti-gravity valve 150 from line 220 through line 206, inlet and outlet, into the upper portion of the body garment. In addition, line 204 senses the pressure in the mask area of the helmet for controlling the breathing regulator while line 162 provides communications from the wearer to external of the suit. Button 210 simply refers to the means for PEC release while button 212 is for testing the suit for pressurization.

Emergency Oxygen System

The emergency oxygen system 170 contains 300 liters standard temperature and pressure, dry (STPD) aviator's oxygen, to provide breathing gas and counterpressure in the event of high altitude bailout or decompression, as well as allowing limited mission continuation in case of aircraft oxygen system failure. An indicator visible to the crew member registers percent of supply remaining or system pressure. The emergency oxygen system is accessible and can be safely replenished or replaced during ground turnaround.

Microclimate Conditioning System

The microclimate conditioning system (not shown), the air conditioning system, for the APS is a derivative of that used in the F/A-18 when an anti-exposure suit is worn. It can be used in place of the liquid coolant system and is the preferred system. The system consists of a temperature control valve, temperature control/sensor, and a temperature selector, and associated plumbing and wiring. Warm air from engine bleed and cold air to the ECS is supplied to the temperature control valve. The wearer selects his desired air temperature and the temperature controller/sensor maintains the selected temperature. The conditioned air is supplied to the suit vent layer through the composite assembly.

Portable Ventilation System/Air Conditioning

The portable ventilation system 172, the alternate air conditioning system, provides filtered, conditioned air to the APS during ground transport and pre-flight. The unit consists of four Mil. Std. M38 or C2 filters 174 that provide CB filtration of the breathing and cooling air. A centrifugal fan blower directs the filtered air through a heat exchanger at a nominal ten CFM flow rate. A brushless electrically commutated direct current (ECDC) motor 178 is used to power the fan, which minimizes electromagnetic interference (EMI) problems. Power to the motor is supplied by rechargeable batteries (not shown) of one hour duration. The unit can also accommodate a 28 volt direct current (VDC) power source to conserve battery life if it is desired during use. The portable vent system includes flow rate and temperature controls so the wearer can select his desired heating or cooling load.

When the unit is used for cooling, the heat exchanger is filled with ice and water, which removes heat from the air flowing through the heat exchanger tubing. For heating, resistance heating elements on the outside of the heat exchanger may be connected to batteries and provide heat to the air flowing through the heat exchange tubing. Chemical heat or heat pads are an alternative The components of the portable vent system are packaged in a 10" × 16" × 9 ½" aluminum carrying case. Moveable dry sorbent powder filters are included on the case in order to cover the air inlets and protect the CB filters from decontamination powders. The system weight is anticipated to be nine pounds, with a capacity for seven pounds of ice, batteries, chemical heat, heat packs, etc. to provide cooling or heating.

Test Equipment

Portable test equipment 180 has been designed that allow pre-flight test capability for gas tight integrity of the suit assembly along with a communications system check. The tester can be used by the life support technician during fitting of the aircrew, periodic inspections, and maintenance procedures.

The portable test equipment contains all the necessary controls 182, regulators (not shown), timers 186, fittings 188, etc. to allow quick and easy testing of the APS. The equipment is packaged in a 14" × 18" × 9" aluminum carrying case and weights approximately 20 pounds. Go/no-go indicator lights 184 are used in lieu of gauges to simplify the test operation.

The pressure test sequence essentially consists of attaching the tester to the suit assembly through the PEC, opening the fill valve on the tester and pushing the "FILL" button. The suit assembly then fills to 3.5 psi. When the suit reaches this pressure, a panel light reading "TEST PRESSURE" is lit indicating the test pressure has been achieved. When ready to start the leak test, a "START TEST" button is pushed, which activates a "TEST IN PROGRESS" light and starts a timer. After a 15-second dwell test, a green "PASS" light or red "FAIL" light will be lit indicating that the suit has either maintained a minimum pressure of 3.0 psi or has allowed more air to leak out than can be allowed. A panel mounted toggle valve releases suit air at the conclusion of the test. Two relief valves are incorporated in the circuit to provide safe operation should an over-pressure condition occur.

Prototype Evaluation Equipment

The design of the prototype evaluation equipment allows testing of the APS in the lab environment. The prototype evaluation equipment includes a composite assembly and PEC, the portable ventilation system, the portable test equipment, and emergency oxygen system bottle, and fittings for air supplies on a 36" × 22" cart. The prototype evaluation equipment simulates the altitude pressurization air, the anti-G pressurization air, and the ventilation air that the wearer would have in the aircraft.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed is:

1. An aircrew protection system for flight crew to provide protection from the effects of acceleration and altitude during flight, said flight screw having an upper body, waist, and lower body, a neck, and a head with mouth and nose, comprising:
   a partial pressure suit including inflatable upper bladders and inflatable lower bladders,
   an inelastic outer shell including upper and lower portions for covering the upper body and the lower body,
   upper bladder means within said shall for covering at least a portion of said lower body,
   said upper and lower bladder means operating when extended by fluid under pressure to displace space between the outer shell and the flight crew body and to so place circumferential tension and mechanical pressure about the related body portion,
   a full pressure helmet assembly including a helmet and, an oral nasal mask mounted within said helmet,
   said helmet constructed to completely cover said head, with said mask defining a breathing volume at said nose and said mouth separate from the remainder of said helmet,
   a neck shroud depending from the helmet for being tucked under the collar of the suit and in a pneumatically sealed relation to said neck and to said helmet,
   means for connecting said upper bladder means and oral nasal mask to a source of breathing gas under a first pressure,
   means for connecting said lower bladder means to a source of fluid under a second pressure, and
   means for controlling the first and second pressures according to schedules responsive to the acceleration and altitude encountered.

2. The aircrew protection system as set forth in claim 1 wherein said helmet assembly includes a rigid shell, a faceplate, and means for mounting the faceplate for movement between a first raised inoperative position and a lowered operative position sealed to the helmet to isolate the head of the wearer from ambient conditions, said faceplate having an upper transparent portion and a lower portion for mounting said mask to pneumatically isolate the wearer's nose and mouth from the remainder of the wearer's head.

3. The aircrew protection system as set forth in claim 1 wherein the suit assembly has independent means above and below said waist for providing different pneumatic pressures thereto.

4. The aircrew protection system as set forth in claim 1 and further including ventilation means formed in the suit assembly above the waist.

5. The aircrew protection system as in claim 1 in which
   said control means provide one pressure at one schedule to the nose and mouth of the wearer under a high gravity condition and provide a different pressure at a different schedule to the nose and mouth of the wearer under a low ambient pressure condition.

6. The integrated aircrew protection system as in claim 1 further in which said shroud, when inflated to low pressures, is constructed and arranged so that it remains flexible enough to be moved by the aircrew's head.

7. The advanced aircrew protection system in claim 1 further in which:
   said suit assembly is provided with an interior impermeable layer, said inflatable bladders being secured thereto in selected areas, and an exterior restraint layer essentially co- extensive with the interior layer to limit the amount of expansion of the bladders when inflated.

8. The aircrew protection system of claim 7 further in which:
   said interior air-impermeable liner extends to essentially the full extent of the body of the wearer, said bladders being peripherally secured to the impermeable liner at selected areas thereof.

9. The suit as set forth in claim 8 wherein said lower bladders surround both legs of the wearer and cover the front of the abdomen.

10. The suit as set forth in claim 9 further wherein said lower bladders cover portions of the wearer's feet.

11. The suit as set forth in claim 8 wherein said upper bladders cover the chest and surround the arms of a wearer.

12. The suit as set forth in claim 11 and further including gloves with bladders and with release couplings for pneumatically joining the gloves to said upper bladders.

13. The suit as set forth in claim 8 and further including ventilation means within an upper portion of said air impermeable liner.

14. The advanced aircrew protection system of claim 1 further in which said helmet includes
   a rigid shell having an opening over the face,
   a faceplate means for coupling said faceplate to said shell for movement between a position raised away from said opening and a lowered position sealed to said opening, said faceplate having a transparent visor above and a mounting portion.

15. The aircrew protection system as in claim 1 in which said suit assembly comprises
   an outer restraint garment having upper and lower torso portions which cover the body from the ankles to the neck and wrists,
   said outer garment being made of a first flexible fabric which is constructed of materials rendering the outer garment non-stretchable and fire resistant, an inner garment made of a second flexible fabric which is substantially non-stretchable and made of materials rendering the same impermeable to fluids and chemical/toxic agents, means made of a flexible fabric which is impermeable, and attached to said inner garment to form therewith said bladders and extremities.

16. The aircrew protection system of claim 15 further including means for adjusting the circumference of said outer garment close enough to that of the wearer that each bladder operates to tension the adjacent portion of the outer garment so as to compress the arms, legs, and the upper and lower body by mechanical pressure when said bladders are inflated.

17. The aircrew protection system as in claim 1 further including a waist portion for connecting said upper and lower portions together in a one-piece garment.

18. An advanced aircrew protection system for wearing on the body and head of a person and having therefore upper and lower torsos as well as a generally upper and lower parts, comprising:

a rigid helmet, shell having a face opening, a faceplate coupled with respect thereto for movement between an elevated inoperative position and a lowered operative position in gas-tight sealed engagement with said opening to form a helmet enclosure, said faceplate having a transparent visor, an oral nasal mask attached to said faceplate adapted to seal the nose and mouth of the wearer from the remainder of the helmet enclosure, a partial pressure suit for covering the upper and lower torsos of the body of the aircrew, said suit comprising an outer garment having upper and lower torso portions which cover the body from the ankles to the neck and wrists, said outer garment being made of a flexible fabric which is constructed of materials rendering the outer garment non-stretchable and having portions for covering the upper and lower torsos to serve as a restraint layer, an inner garment made of flexible fabric made of materials rendering the same impermeable to fluids, means made of a flexible and impermeable fabric forming bladders over selected portions of the upper and lower torsos of the body, connecting means communicating with said bladders for receiving fluid under pressure, means for providing fluid at a first predetermined pressure to the bladders of the lower torso, means for independently supplying pressurized fluid to said helmet and to the oral nasal mask and bladders of the upper torso, and a neck shroud secured at its upper edge to the lower edge of the helmet shell and extending downwardly into a neck opening at the top of the suit and into and around the upper part of the suit whereat it is retained by pressure transfer from the tension of the suit, said shroud being in communication with the helmet to receive fluid therefrom for pressurizing the neck of the wearer so as to maintain the pneumatic pressure in the helmet assembly.

19. The aircrew protection system of claim 18 further including means for adjusting the circumference of the upper body and lower body portions of the outer garment close enough to the wearer that said bladders operate to tension said outer garment so as to compress the upper body and the lower body.

20. An integrated aircrew protection system, comprising, a partial pressure suit for covering the body including an outer garment made of flexible inelastic material, said suit further including an upper bladder mounted in the suit and interposed between the outer garment and the wearer's chest and arms, said suit further including a lower bladder mounted in the suit and interposed between the outer garment and the wearer's abdomen, legs, and feet, said upper and lower bladders having inner and outer fluid impermeable walls sealed together about the periphery so that, when filled with pressurized fluid, each bladder expands to put mechanical pressure on the said portion of the wearer's body by decreasing the available space within the inelastic outer garment and the body whereby said suit is operated at partial pressure, a helmet assembly including a helmet and an oral nasal mask, a flexible neck shroud for attaching the helmet assembly and the suit together and including a diaphragm for sealing the helmet at the neck from the suit and the helmet assembly from ambient conditions, so that said helmet and shroud defines a first volume with said oral nasal mask defines a second volume, means for connecting said first volume to air under a first pressure, means for connecting said oral nasal mask and upper bladder together to a common source for providing breathing air under a second pressure, means for connecting said lower bladder to a source of air under a third pressure, and means for independently controlling said first, second, and third pressures on schedules dependent upon accelerations and ambient pressure.

21. An integrated aircrew protection system, comprising, a partial pressure suit for covering the body including an outer garment made of flexible inelastic material, and an inner liner of air impermeable material extending throughout the extent of the upper and lower portions of the suit said liner providing cold water body protection and a chemical barrier throughout the extent of the upper and lower portions of the suit, said suit further including an upper bladder mounted in the suit and interposed between the outer garment to cover the wearer's chest and to surround the arms, said upper bladder being formed by air impermeable walls sealed about a periphery so that, when filled with pressurized fluid, said bladder expands to put mechanical pressure on the said portion of the wearer's body by decreasing the available space within the inelastic outer garment and the upper body, gloves with bladders and with release couplings for pneumatically joining the gloves to the upper bladder, means provided within the upper portion of the suit for providing ventilation air to the wearer's body, said suit further including a lower bladder mounted in the suit and interposed between the outer garment and the wearer's abdomen, surrounding the legs, and covering portions of the feet, said lower bladder having being formed by lower air impermeable walls sealed together about a periphery so that, when filled with pressurized fluid, each lower bladder expands to put mechanical pressure on the wearer's body by decreasing the available space within the inelastic outer garment and the lower body;

a helmet assembly including a rigid shell portion covering the majority of the wearer's head and an a oral nasal mask with a face seal for fitting over the wearer's nose and mouth;

a flexible neck shroud formed of flexible material having an upper portion coupled to the bottom of the helmet and a lower portion extending downwardly therefrom within the suit assembly and sealing at a point along the wearer's neck and also including an elastic diaphragm secured around the neck for sustaining a separate pressure within the helmet assembly independent of the pressure within the suit assembly so that said helmet and shroud define a first volume separate from a second volume within said oral nasal mask;

means for connecting said first volume to air under a first pressure;

means for connecting said first volume to air under a first pressure;

means for connecting said oral nasal mask and upper bladder together to a common source for providing breathing air under a second pressure;

means for connecting said lower bladder to a source of air under a third pressure; and control means for independently controlling said first, second, and third pressures on schedules dependent upon accelerations and ambient pressure, said control means including a breathing regulator for sensing low pressure and for supplying a flow of pressurized oxygen to the upper portion of the suit assembly and to the nose and mouth assembly when said low pressure condition exists, and an anti-gravity valve for providing of pressure to the lower portion of the suit assembly upon the occurrence of a high gravity condition.

22. An advanced, integrated aircrew protection system comprising:

a helmet assembly adapted to sustain a full pneumatic pressure within the helmet adjacent to the head of the wearer;

said helmet assembly including an oral nasal mask said mask defining a breathing volume at the nose and mouth separate from the remainder of said helmet and means to provide a fluid supply from a second pneumatic pressure means to within the mask and to selected upper parts of the body of a wearer, the helmet also having means to movably couple the mask with respect to the remainder of the helmet between an inoperative position and an operative position;

a suit assembly adapted to sustain a partial pressure adjacent to selected portions of the body of the wearer;

a first pneumatic pressure means for supplying a fluid under a first pressure to selected lower parts of said suit assembly;

a neck shroud coupled between with the helmet assembly the suit assembly, said shroud being constructed to pneumatically isolate said full pressure helmet assembly from said partial pressure suit assembly; and second pneumatic pressure means for independently supplying pressurized fluid to the helmet assembly and to selected other portions of said suit assembly, and a control assembly including first control means to activate said first pneumatic pressure means in response to a high gravity situation as a function of the extent of the high gravity, second control means to activate the second pneumatic pressure means in response to a low pressure situation as a function of the extent of such low pressure, and third control means operatively coupling the first and second control means.

23. The aircrew protection system as in claim 22 in which said control assembly and said control means provide one pressure at one schedule to the nose and mouth of the wearer under a high gravity condition and provide a different pressure at a different schedule to the nose and mouth of the wearer under a low pressure condition.

24. The aircrew protection system as in claim 23 wherein said control means includes a breathing regulator which senses low pressure and an anti-gravity valve which senses high gravity with means to initiate the providing of the one pressure at the one schedule to the nose and mouth of the wearer upon the occurrence of a high gravity condition.

25. The aircrew protection system as in claim 24 wherein a said breathing regulator includes means to initiate the providing of the different pressure to the nose and mouth of the wearer upon the occurrence of a low pressure condition.

26. The aircrew protection system as in claim 24 wherein the anti-gravity valve includes means to initiate the providing of pneumatic pressure to the lower portion of the suit assembly upon the occurrence of a high gravity condition.

27. The control assembly as set forth in claim 24 wherein said anti-gravity valve provides pneumatic pressure to the lower portion of the suit assembly during a high gravity situation and also sends a signal to the breathing regulator to provide a flow of pressurized oxygen to the upper portion of the suit assembly and to said oral nasal mask.

28. The aircrew protection system as set forth in claim 24 wherein said breathing regulator provides pneumatic pressure to said oral nasal mask and upper portion of the suit assembly and also sends a signal to the anti-gravity valve for providing a flow of pressurized fluid to the lower portion of the suit assembly.

* * * * *